(12) United States Patent
Sugimoto et al.

(10) Patent No.: US 10,311,729 B2
(45) Date of Patent: Jun. 4, 2019

(54) NAVIGATION SYSTEM AND ON-BOARD UNIT

(71) Applicant: MITSUBISHI HEAVY INDUSTRIES MACHINERY SYSTEMS, LTD., Kobe-shi, Hyogo (JP)

(72) Inventors: Kiichi Sugimoto, Tokyo (JP); Ryota Hiura, Tokyo (JP); Takeshi Fukase, Tokyo (JP); Takuma Okazaki, Tokyo (JP)

(73) Assignee: MITSUBISHI HEAVY INDUSTRIES MACHINERY SYSTEMS, LTD., Kobe-Shi, Hyogo (JP)

( * ) Notice: Subject to any disclaimer, the term of this patent is extended or adjusted under 35 U.S.C. 154(b) by 29 days.

(21) Appl. No.: 15/543,446

(22) PCT Filed: Jan. 16, 2015

(86) PCT No.: PCT/JP2015/051046
§ 371 (c)(1),
(2) Date: Jul. 13, 2017

(87) PCT Pub. No.: WO2016/113893
PCT Pub. Date: Jul. 21, 2016

(65) Prior Publication Data
US 2017/0372608 A1    Dec. 28, 2017

(51) Int. Cl.
*G08G 1/09* (2006.01)
*G08G 1/01* (2006.01)
(Continued)

(52) U.S. Cl.
CPC ....... *G08G 1/096811* (2013.01); *G01C 21/28* (2013.01); *G01C 21/3415* (2013.01);
(Continued)

(58) Field of Classification Search
CPC ............. G08G 1/096811; G08G 21/26; G08G 1/0133; G08G 11/0112; G01C 21/34;
(Continued)

(56) References Cited

U.S. PATENT DOCUMENTS

2010/0332130 A1    12/2010   Shimizu et al.
2012/0158285 A1*   6/2012    Yamazaki .......... G01C 21/3461
                                                             701/410
(Continued)

FOREIGN PATENT DOCUMENTS

JP    2002-319098 A    10/2002
JP    3447968 B2        9/2003
(Continued)

OTHER PUBLICATIONS

PCT/ISA/210, "International Search Report for International Application No. PCT/JP2015/051046," dated Apr. 21, 2015.
(Continued)

*Primary Examiner* — Yonel Beaulieu
*Assistant Examiner* — Martin A Weeks
(74) *Attorney, Agent, or Firm* — Manabu Kanesaka

(57) ABSTRACT

A navigation system includes: a traffic condition calculation unit (222) that calculates an evaluation value indicating a traffic condition of each road segment included in a target area; a guidance route determination unit (223) that determines a route in which a degree of non-congestion based on the traffic condition evaluation value of a road segment included in a route to a destination of each vehicle is the highest as a guidance route on the basis of the traffic condition evaluation value calculated by the traffic condition calculation unit and the destination of each vehicle; and a guidance route providing unit (224) that provides the guidance routes determined by the guidance route determination unit to a driver of the corresponding vehicle.

9 Claims, 17 Drawing Sheets

(51) Int. Cl.
    *G01C 21/28*     (2006.01)
    *G08G 1/0968*     (2006.01)
    *G01C 21/34*     (2006.01)
    *G01C 21/36*     (2006.01)

(52) U.S. Cl.
    CPC ..... *G01C 21/3492* (2013.01); *G01C 21/3691* (2013.01); *G08G 1/0112* (2013.01); *G08G 1/0133* (2013.01); *G08G 1/0145* (2013.01)

(58) Field of Classification Search
    CPC ............. G01C 21/28; G01C 21/3492; G01C 21/3415; G01C 21/3691
    See application file for complete search history.

(56) References Cited

U.S. PATENT DOCUMENTS

| | | | |
|---|---|---|---|
| 2015/0360688 A1 | 12/2015 | Tanaka et al. | |
| 2016/0046237 A1* | 2/2016 | Sugimoto | B60R 1/00 348/148 |
| 2016/0244062 A1* | 8/2016 | Tudosie | B60W 50/0097 |

FOREIGN PATENT DOCUMENTS

| | | |
|---|---|---|
| JP | 2004-157768 A | 6/2004 |
| JP | 2004-301667 A | 10/2004 |
| JP | 3905968 B2 | 4/2007 |
| JP | 2007-249705 A | 9/2007 |
| JP | 2009-176187 A | 8/2009 |
| JP | 2010-008330 A | 1/2010 |
| JP | 2013-125396 A | 6/2013 |
| WO | 2013/171780 A1 | 11/2013 |
| WO | 2014/118962 A1 | 8/2014 |

OTHER PUBLICATIONS

PCT/ISA/237 "Written Opinion of the International Searching Authority for International Application No. PCT/JP2015/051046," dated Apr. 21, 2015.

JIPII Journal of technical disclosure No. 2010-503431, Toyota Motor Corp., Jul. 1, 2010, entire text, all drawings.

\* cited by examiner

NAVIGATION SYSTEM AND ON-BOARD UNIT

RELATED APPLICATIONS

The present application is National Phase of International Application No. PCT/JP2015/051046 filed Jan. 16, 2015, the disclosure of which is hereby incorporated by reference herein in its entirety.

TECHNICAL FIELD

The present invention relates to a navigation system and an on-board unit.

BACKGROUND ART

A system in which, when a server retrieves a route to a destination depending on a destination of a vehicle, the server manages current positions and destinations of respective vehicles in a centralized manner and retrieves the route of each vehicle is known (for example, see Patent Literature 1).

The server disclosed in Patent Literature 1 retrieves a route of a vehicle Y so that the same road as a road P included in a route of a vehicle X is not included in the route of the vehicle Y and transmits the retrieved route to the vehicle Y. In this way, it is possible to distribute vehicles travelling on the road P.

CITATION LIST

Patent Literature

[Patent Literature 1]
Japanese Unexamined Patent Publication No. 2004-301667

SUMMARY OF INVENTION

Technical Problem

However, when a server manages a huge number of vehicles, for example, it is highly likely that the roads included in the routes of respective vehicles overlap partially. In this case, when there are a number of vehicles travelling on the same road, it is difficult to improve traffic conditions of an entire target area even if respective vehicles travel along different routes.

Solution to Problem

According to an aspect of the present invention, a navigation system includes: a traffic condition calculation unit (222) that calculates a traffic condition evaluation value indicating a traffic condition of each road segment included in a target area; a guidance route determination unit (223) that prepares a plurality of routes to the same destination for each vehicle in the target area, calculates an area traffic condition index value indicating a traffic condition of a group of vehicles in the target area on the basis of the traffic condition evaluation value calculated by the traffic condition calculation unit according to the plurality of routes to the same destination of each vehicle, and determines a route in which a degree of non-congestion based on the area traffic condition index value is the highest among the plurality of routes to the same destination for one vehicle as a guidance route; and a guidance route providing unit (224) that provides the guidance route determined by the guidance route determination unit to a driver of a corresponding vehicle.

With this configuration, it is possible to determine a guidance route which improves the traffic condition of an entire navigation target area and to provide the same to the driver of each vehicle. Therefore, when the guidance route is set as the navigation route of each vehicle, each vehicle can be guided along the guidance route. In this way, it is possible to improve the traffic condition of the entire navigation target area.

According to an aspect of the present invention, the guidance route determination unit prepares routes that do not include a bottleneck road segment in which a value based on the traffic condition evaluation value is lower than a reference value as the plurality of routes to the same destination.

With this configuration, it is possible to determine a route that does not include the bottleneck road segment as the guidance route. Therefore, it is possible to remove the bottleneck road segment in which the evaluation value indicated by the traffic condition evaluation value is worse than the reference value from the guidance route and to further improve the traffic condition of the entire navigation target area.

According to an aspect of the present invention, when a setting route to the destination is set for the vehicle, the guidance route determination unit prepares at least one candidate route of which the destination is the same as the setting route and in which the route to the destination is different from the setting route and calculates the area traffic condition index value for the setting route and the area traffic condition index value for the candidate route, and the guidance route providing unit provides a candidate route in which the degree of non-congestion based on the area traffic condition index value is higher than that of the setting route to the driver of the corresponding vehicle.

With this configuration, when the traffic condition changes after the setting route has been set and the other route provides a better traffic condition than the setting route set in advance, it is possible to provide a route that provides a better traffic condition to the driver of each vehicle. Therefore, it is possible to improve the traffic condition of the entire navigation target area according to a change in the traffic condition.

According to an aspect of the present invention, the navigation system further includes: a first travel record learning unit (225) that predicts a predicted guidance route which is highly likely to be set for the vehicle on the basis of a record value set as a route for navigating the vehicle among the guidance routes provided by the guidance route providing unit, wherein the guidance route determination unit calculates the area traffic condition index value for the predicted guidance route predicted by the first travel record learning unit and the area traffic condition index value for the plurality of routes to the same destination, and the guidance route providing unit provides the predicted guidance route in which the degree of non-congestion based on the area traffic condition index value is higher than that of the plurality of routes to the same destination to the driver of the corresponding vehicle.

With this configuration, a guidance route which is highly likely to be set for each vehicle can be provided to the driver of the corresponding vehicle.

According to an aspect of the present invention, when there is a route in which the degree of non-congestion based on the area traffic condition index value is higher than that of the predicted guidance route among the plurality of routes to the same destination, the guidance route providing unit provides the predicted guidance route to the driver of the corresponding vehicle if a difference between a highest value of the degree of non-congestion and the degree of non-congestion of the predicted guidance route is within a predetermined range.

With this configuration, a guidance route predicted by the travel record learning unit 225 can be provided to the driver of the corresponding vehicle more preferentially than a candidate route that provides a relatively good area traffic condition index value. In this way, when there is no great difference in the area traffic condition index value, it is possible to provide a guidance route corresponding to the past preference of the driver.

According to an aspect of the present invention, the navigation system further includes: a second travel record learning unit (225) that predicts a traffic condition which is highly likely to occur in the road segment on the basis of a record value of the traffic condition evaluation value calculated by the guidance route determination unit, wherein the traffic condition calculation unit calculates the traffic condition evaluation value corresponding to each road segment on the basis of the traffic condition predicted by the second travel record learning unit.

With this configuration, a traffic condition which is highly likely to occur in a road segment can be reflected in the traffic condition evaluation value.

According to an aspect of the present invention, the navigation system further includes: a third travel record learning unit (225) that predicts a predicted destination which is highly likely to be set for the vehicle on the basis of a record value set as the destination of each vehicle, wherein the guidance route determination unit prepares a plurality of routes to the predicted destination as the plurality of routes to the same destination on the basis of the predicted destination predicted by the third travel record learning unit.

With this configuration, a destination which is highly likely to be set for the vehicle can be set as the destination of navigation. Therefore, it is possible to alleviate the time and effort of inputting a destination or the like for the driver.

According to an aspect of the present invention, the navigation system further includes: an external information acquisition unit (226) that acquires external information via a communication unit, wherein the traffic condition calculation unit calculates the traffic condition evaluation value on the basis of the external information acquired by the external information acquisition unit.

With this configuration, it is possible to calculate the traffic condition evaluation value by taking the external information into consideration. Therefore, it is possible to ascertain the traffic condition which cannot be ascertained from the movement of vehicles only.

According to an aspect of the present invention, an on-board unit includes: a positional information generation unit (161) that acquires vehicle positional information indicating a position of a vehicle; a communication unit (101) that transmits the vehicle positional information acquired by the positional information generation unit and route information indicating a setting route to a destination set for the vehicle to a navigation server; and a navigation control unit (162) that receives at least one candidate route of which the destination is the same as the setting route and in which the route to the destination is different from the setting route from the navigation server via the communication unit and outputs information for navigating the vehicle according to the candidate route from an output unit, the candidate route being a route in which a degree of non-congestion based on an area traffic condition index value is higher than a degree of non-congestion based on the area traffic condition index value of the setting route, the area traffic condition index value indicating a traffic condition of a group of vehicles in a target area, and the area traffic condition index value being calculated according to the setting route and the candidate route on the basis of an evaluation value indicating a traffic condition of each road segment included in the target area.

Advantageous Effects of Invention

It is possible to improve the traffic conditions of an entire navigation target area.

DESCRIPTION OF EMBODIMENTS

Hereinafter, an example of a navigation system 1 according to embodiments of the present invention will be described.

First Embodiment

Figure 1:
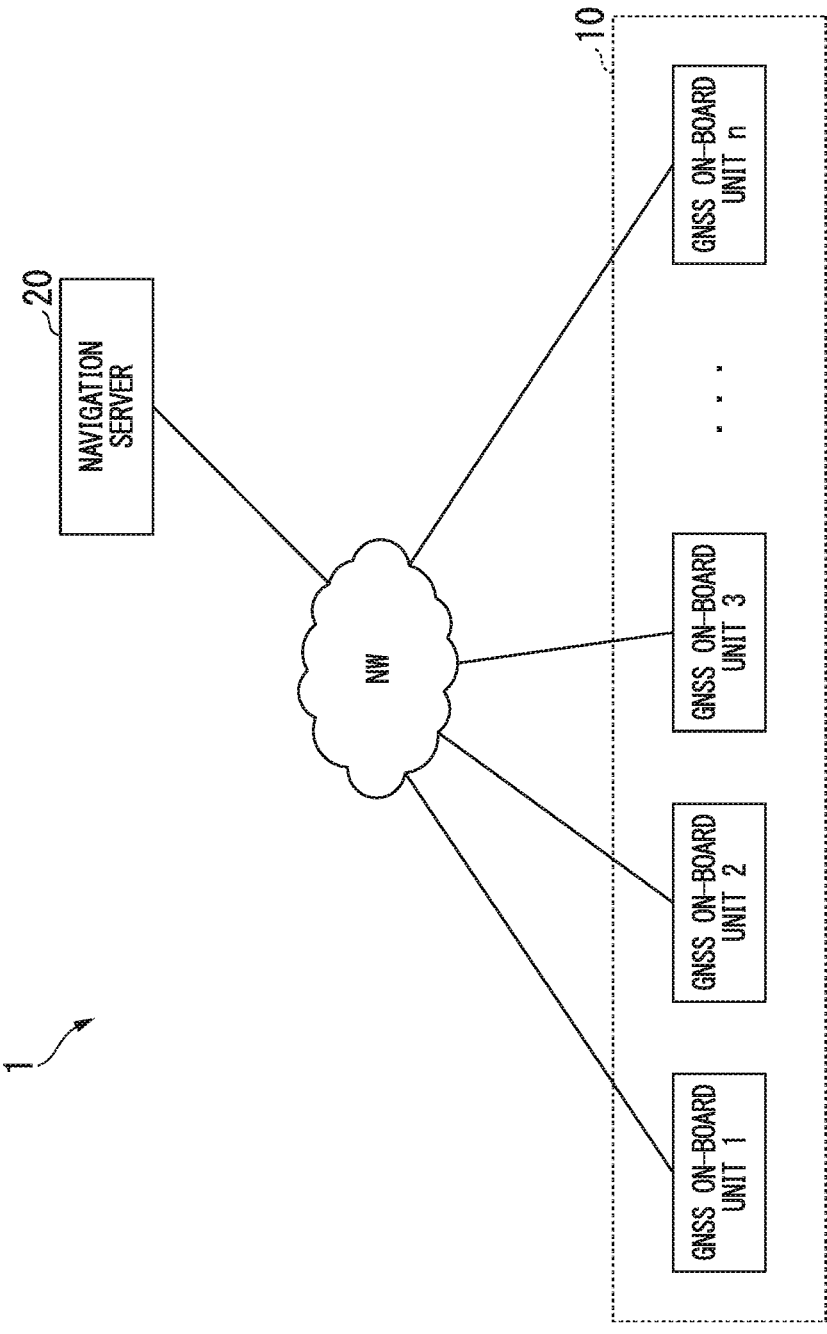
FIG. 1 is a schematic diagram illustrating an example of a navigation system according to a first embodiment of the present invention.

Hereinafter, an example of a navigation system 1 according to an embodiment of the present invention will be described. FIG. 1 is a schematic diagram illustrating an example of the navigation system 1 according to the embodiment of the present invention.

[Navigation System 1]

As illustrated in FIG. 1, the navigation system 1 includes a plurality of GNSS on-board units 10 (GNSS on-board unit 1, GNSS on-board unit 2, . . . , and GNSS on-board unit n) and a navigation server 20. The plurality of GNSS on-board units 10 and the navigation server 20 are connected via a network such as the Internet. In the embodiment, because the plurality of GNSS on-board units 10 have the same configuration and function, the configuration and the function of one GNSS on-board unit 10 will be described.

The GNSS on-board unit 10 is mounted on a vehicle and acquires positional information indicating the position of a vehicle using a global navigation satellite system (GNSS). The GNSS on-board unit 10 transmits the acquired positional information to the navigation server 20.

The GNSS on-board unit 10 may perform a process of paying tolls when it is determined that the vehicle has passed through a charging area on the basis of the positional information acquired by the GNSS. Without being limited thereto, the GNSS on-board unit 10 may perform the process of paying tolls on the basis of radio communication between the vehicle and a road-side antenna provided in an entrance or the like of a toll road using DSRC communication. In the embodiment, the description of a toll paying function or the like included in the GNSS on-board unit 10 will not be provided.

The navigation server 20 is connected to be communicable with the plurality of GNSS on-board units 10 via the network. The navigation server 20 receives information (hereinafter referred to as vehicle positional information) and the like indicating the position of the GNSS on-board unit 10 from the plurality of GNSS on-board units 10 in a target area (hereinafter referred to as a navigation target area) for which navigation information is provided and stores the vehicle positional information in a storage unit. The navigation server 20 analyzes traffic conditions of vehicles in the navigation target area on the basis of the received vehicle positional information and the like. The navigation server 20 calculates a guidance route for optimizing an overall traffic condition of the navigation target area on the basis of the analysis result of the vehicle traffic conditions. The guidance route is a route along which vehicles are guided to the destination of each vehicle while target vehicles are guided in order to distribute passing vehicles from a road in which passing vehicles converge or a road in which convergence is predicted to a road in which passing vehicles do not converge or a road in which convergence is not predicted.

In the embodiment, the navigation server 20 transmits the calculated guidance route to the GNSS on-board unit 10. Without being limited thereto, the navigation server 20 may transmit the calculated guidance routes to a terminal possessed by the user correlated with the GNSS on-board unit 10 and a car navigation system of a vehicle on which the GNSS on-board unit 10 is mounted.

(Configuration of GNSS On-Board Unit 10)

Figure 2:
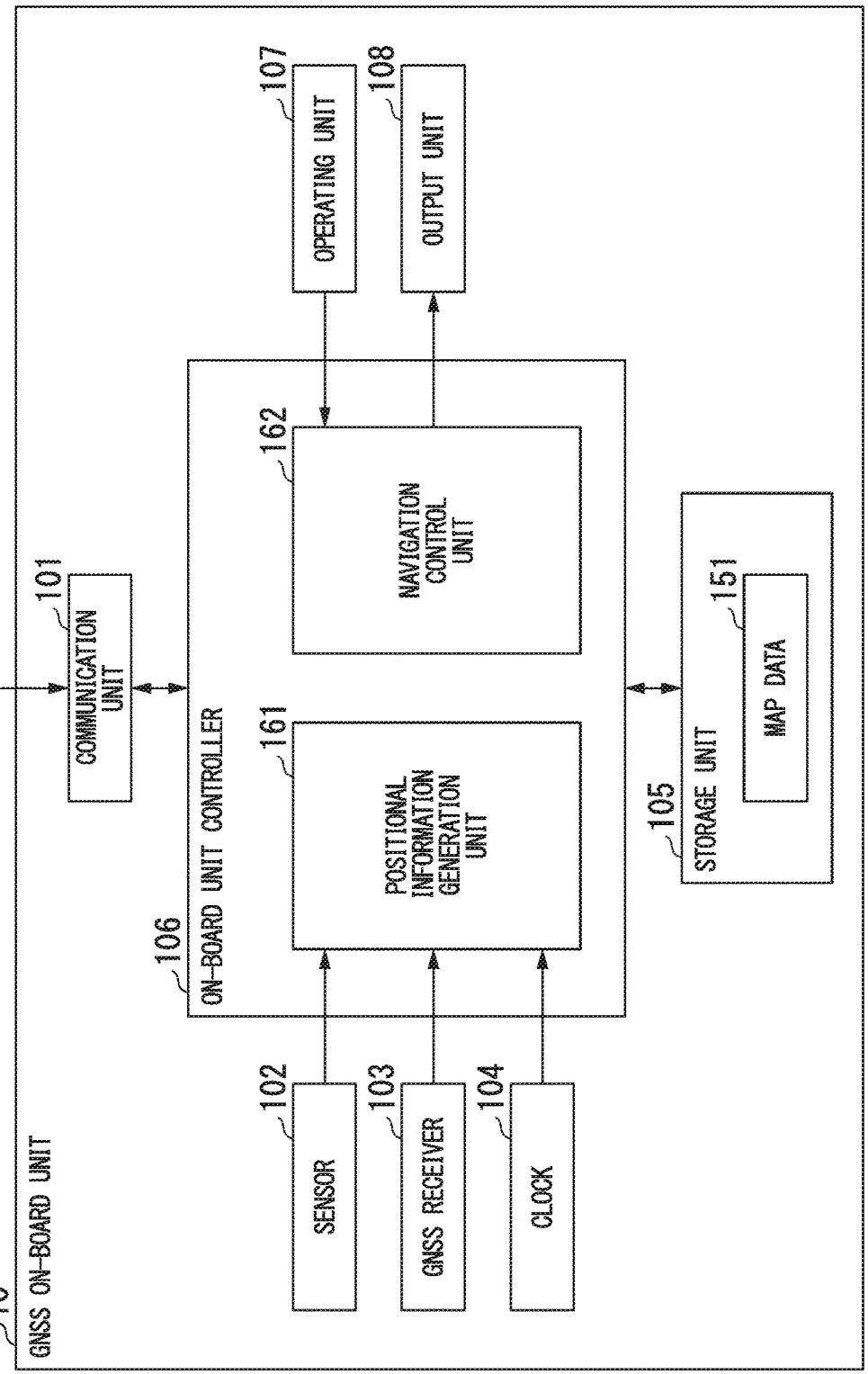
FIG. 2 is a diagram illustrating a configuration example of a GNSS on-board unit.

Next, the configuration of the GNSS on-board unit 10 will be described in detail with reference to FIG. 2. FIG. 2 is a diagram illustrating a configuration example of the GNSS on-board unit 10.

As illustrated in FIG. 2, the GNSS on-board unit 10 includes a communication unit 101, a sensor 102, a GNSS receiver 103, a clock 104, a storage unit 105, an on-board unit controller 106, an operating unit 107, and an output unit 108.

The communication unit 101 transmits the vehicle positional information and the like acquired by the GNSS on-board unit 10 to the navigation server 20 via a wide area network such as the Internet. Moreover, the communication unit 101 receives information on the guidance route from the navigation server 20 and outputs the same to the on-board unit controller 106.

The sensor 102 includes an acceleration sensor, a vehicle speed sensor, a gyro sensor, and the like, detects a change in the state of the vehicle on which the GNSS on-board unit 10 is mounted, and outputs the detection result to the on-board unit controller 106.

The GNSS receiver 103 receives radio waves from satellites and outputs information extracted from the radio waves to the on-board unit controller 106.

The clock 104 outputs information (hereinafter date information) indicating a current date and time to the on-board unit controller 106.

The operating unit 107 receives operations from a user. The operating unit 107 outputs operation information indicating the received operations to the on-board unit controller 106.

The output unit 108 includes a display unit that outputs an image and a speaker that outputs audio, for example. The output unit 108 outputs map data indicating routes to the guidance route, for example, from the display unit and outputs audio for providing guidance on the routes to the guidance route from the speaker on the basis of the information input from the on-board unit controller 106.

The storage unit 105 stores map data 151. The map data 151 includes information on a map that displays roads, facilities, and the like according to the coordinate position on the earth. A link ID for identifying each road is included in the map data 151. Links are connected by a node corresponding to an intersection or the like. A node ID for identifying each node is included in the map data 151.

The on-board unit controller 106 is a central processing unit (CPU), for example, and controls the GNSS on-board units 10 in an integrated manner. The GNSS on-board unit 10 includes a positional information generation unit 161 and a navigation control unit 162 as functional units that function when the on-board unit controller 106 which is a CPU executes programs. Some or all of these functional units may be a hardware functional unit such as large scale integration (LSI) or an application specific integrated circuit (ASIC).

The positional information generation unit 161 calculates the position (for example, a coordinate value on the earth) of a vehicle on which the GNSS on-board unit 10 is mounted on the basis of the information acquired from the sensor 102 and the GNSS receiver 103 and detects the vehicle position on a road. The positional information generation unit 161 compares the vehicle position and the map data 151 stored in the storage unit 105 and detects the link ID of the road on which the vehicle travels. In the embodiment, the vehicle positional information indicating the detected vehicle position includes the detected link ID. The interval of detecting link IDs is determined in advance.

The positional information generation unit 161 transmits the vehicle positional information indicating the detected vehicle position and the date information indicating the date on which the vehicle position is detected to the navigation server 20 in correlation with each other via the communication unit 101. Here, the positional information generation unit 161 reads identification information for identifying the GNSS on-board unit 10 from the storage unit 105 and transmits the read identification information to the navigation server 20 together with the vehicle positional information. The identification information may be information that identifies a driver who drives a vehicle or a terminal possessed by the driver.

The positional information generation unit 161 acquires the speed of the vehicle on which the GNSS on-board unit 10 is mounted and transmits speed information indicating the speed of the vehicle to the navigation server 20 via the communication unit 101. The positional information generation unit 161 may calculate the vehicle speed on the basis of the moving distance and the moving time indicated by the vehicle positional information. Moreover, the positional information generation unit 161 may acquire information indicating an engine rotation speed from a driving unit of the vehicle on which the GNSS on-board unit 10 is mounted and calculate the vehicle speed. The speed information may be generated on the navigation server 20 side. The navigation server 20 calculates the vehicle speed on the basis of the moving distance and the moving time indicated by the vehicle positional information received from the GNSS on-board unit 10, for example.

The navigation control unit 162 generates a map image indicating a travelling position of the vehicle on which the GNSS on-board unit 10 is mounted on the basis of the map data 151 stored in the storage unit 105 and the vehicle positional information generated by the positional information generation unit 161 and outputs the map image to the output unit 108. Moreover, when a destination is set via the operating unit 107, the navigation control unit 162 retrieves a route to the destination on the basis of the map data 151 and the vehicle positional information. In the present embodiment, the navigation control unit 162 retrieves a plurality of different routes to the same destination. For example, the navigation control unit 162 calculates routes that connect a current position and a destination on a travelable road using a general route retrieval system. Here, the navigation control unit 162 may calculate the routes which prioritize any one of the conditions including a travel time, a travel distance, and the presence of toll roads.

The navigation control unit 162 generates a map image that displays the routes obtained by retrieval on a map in a superimposed manner and outputs the map image to the output unit 108. In this way, the user can select one route among the routes output to the output unit 108 using the operating unit 107 and set a route for navigating the vehicle. When a route obtained by retrieval is set by the user as a route for navigating the vehicle, the navigation control unit 162 writes setting route information indicating the set route (hereinafter referred to as a setting route) in the storage unit 105. When a destination is set in the storage unit 105, for example, the navigation control unit 162 reads destination information from the storage unit 105 and transmits the read destination information to the navigation server 20 together with the vehicle positional information. When the setting route is set in the storage unit 105, for example, the navigation control unit 162 reads setting route information from the storage unit 105 and transmits the read setting route information to the navigation server 20 together with the vehicle positional information.

Upon receiving information on the guidance route from the navigation server 20, the navigation control unit 162 generates a map image that displays the guidance route on a map in a superimposed manner and outputs the map image to the output unit 108.

(Configuration of Navigation Server 20)

Figure 3:
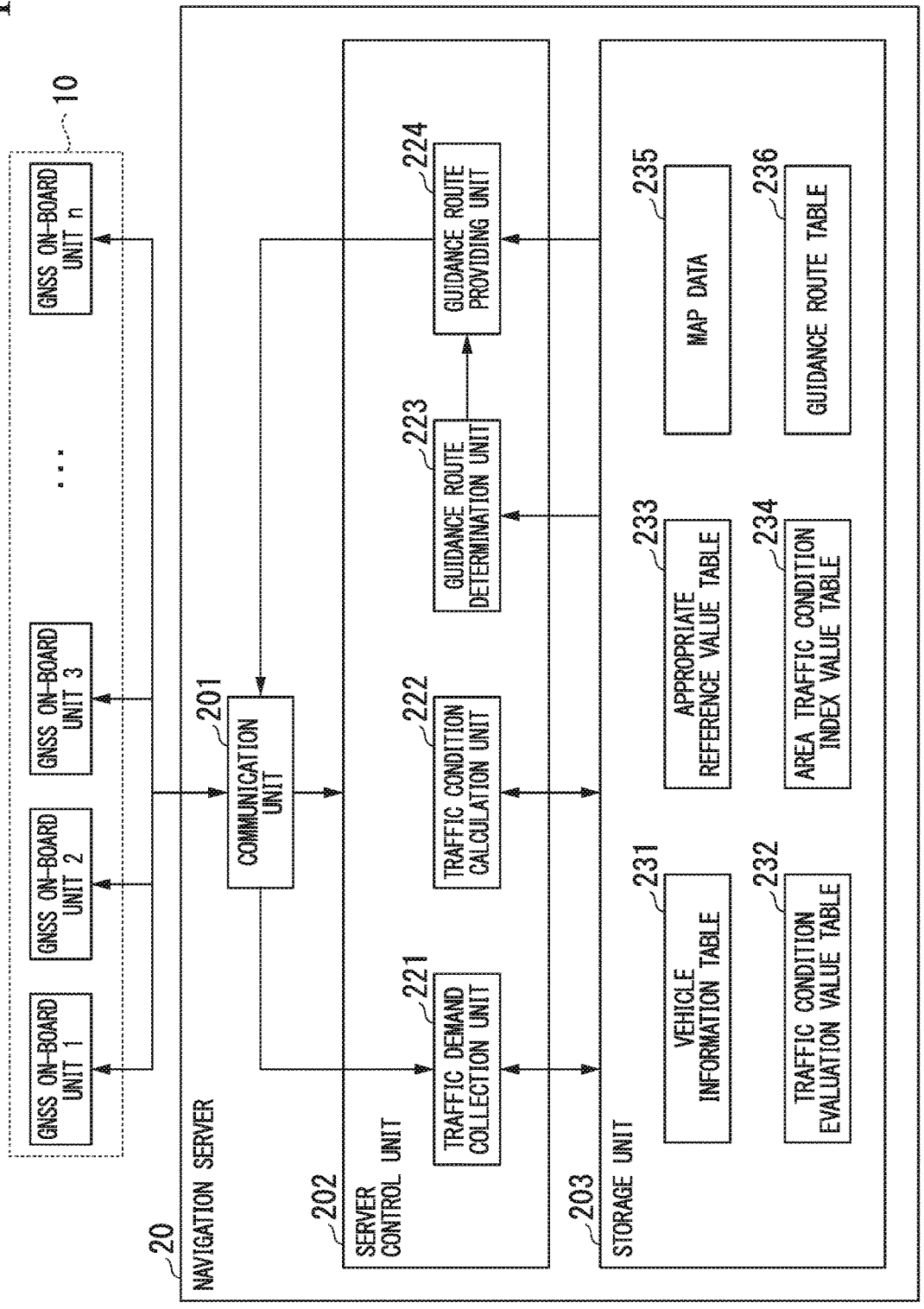
FIG. 3 is a diagram illustrating a configuration example of a navigation server.

Next, the configuration of the navigation server 20 will be described in detail with reference to FIG. 3. FIG. 3 is a diagram illustrating a configuration example of the navigation server 20.

As illustrated in FIG. 3, the navigation server 20 includes a communication unit 201, a server control unit 202, and a storage unit 203.

The communication unit 201 receives vehicle positional information and the like from the GNSS on-board unit 10 via a wide area network such as the Internet. Moreover, the communication unit 201 transmits information on the guidance route to the GNSS on-board unit 10.

The server control unit 202 is a CPU, for example, and controls the navigation server 20 in an integrated manner. The navigation server 20 includes a traffic demand collection unit 221, a traffic condition calculation unit 222, a guidance route determination unit 223, and a guidance route providing unit 224 as functional units that function when the server control unit 202 which is a CPU executes programs. Some or all of these functional units may be a hardware function unit such as an LSI or an ASIC.

The traffic demand collection unit 221 writes information received from the GNSS on-board unit 10 in a vehicle information table 231 of the storage unit 203. Vehicle positional information, date information indicating the date on which the vehicle positional information is acquired, identification information for identifying the GNSS on-board unit 10 or the like, for which the vehicle positional information is acquired, information indicating a destination (hereinafter referred to as destination information), information indicating a vehicle speed (hereinafter referred to as vehicle speed information), and information indicating a setting route to the destination (hereinafter referred to as setting route information) are stored in the vehicle information table 231 in correlation with each other.

When the vehicle speed information is not received from the GNSS on-board unit 10, the traffic demand collection unit 221 calculates the vehicle speed of the vehicle on which the GNSS on-board unit 10 is mounted on the basis of a plurality of items of positional information of vehicles arranged in a time-sequential order.

When the destination information is not received from the GNSS on-board unit 10, the traffic demand collection unit 221 transmits guidance information for setting a destination to the GNSS on-board unit 10. The guidance information for setting the destination includes an input screen or the like for prompting a driver to input a destination. Moreover, the guidance information for setting the destination includes a selection screen that presents a destination set most recently and requests the driver to select whether or not to select the presented destination. Furthermore, the guidance information for setting the destination includes a selection screen that presents the history of destinations set in the past and allows the driver to select any one of the presented destinations.

When the setting route information is not received from the GNSS on-board unit 10, the traffic demand collection unit 221 may retrieve routes to the destination by referring to the map data 235 of the storage unit 203 and write the retrieved routes in the setting route information field of the vehicle information table 231.

The traffic condition calculation unit 222 calculates a value (hereinafter referred to as a traffic condition evaluation value) indicating the traffic conditions of each road segment on the basis of the information read from the vehicle information table 231 of the storage unit 203. In the embodiment, the traffic condition calculation unit 222 calculates the traffic condition evaluation value for the respective road segments included in the navigation target area. The road segments are segments to which different link IDs are allocated, for example. Without being limited thereto, the traffic condition calculation unit 222 may calculate the traffic condition evaluation value for each road segment that extends over a plurality of links.

The traffic condition calculation unit 222 calculates a traffic condition evaluation value P1 for a temporal traffic amount, a traffic condition evaluation value P2 for a traffic density, and a traffic condition evaluation value P3 for a spatial average speed, for example. The traffic condition calculation unit 222 writes information (for example, a link ID) indicating a road segment and information indicating the calculated date in the traffic condition evaluation value table 232 of the storage unit 203 in correlation with the calculated traffic condition evaluation values P1, P2, and P3.

The traffic condition evaluation value P1 for the temporal traffic amount is the number of vehicles passing per hour in a target road segment. The traffic condition calculation unit 222 calculates the traffic condition evaluation value P1 on the basis of the vehicle positional information collected in one hour from the time when the traffic condition evaluation value P1 is calculated, for example.

The traffic condition evaluation value P2 for the traffic density is the number of vehicles per unit distance in a target road segment.

The traffic condition evaluation value P3 for the spatial average speed is an average speed of vehicles per unit distance within a target road segment.

The guidance route determination unit 223 calculates an index value (hereinafter referred to as an area traffic condition index value) indicating a traffic condition in an entire navigation target area on the basis of the traffic condition evaluation values calculated by the traffic condition calculation unit 222 and a setting route to a destination to which each vehicle is scheduled to travel. The guidance route determination unit 223 calculates the area traffic condition index value on the basis of an index value (hereinafter referred to as a route traffic condition index value) indicating the traffic conditions of all road segments included in the navigation target area among the setting routes of the respective vehicles in the navigation target area, for example. In the present embodiment, the guidance route determination unit 223 calculates a value obtained by integrating the route traffic condition index values for respective items for all vehicles in the navigation target area as the area traffic condition index value. The items of the route traffic condition index value include a total travel time and a total congestion distance, for example. The total travel time is an integral value obtained by integrating the travel time taken for each vehicle to travel along the setting route in the navigation target area for all vehicles in the navigation target area, for example. The total congestion distance is an integral value obtained by integrating the distance of road segments which are included in the setting route among the road segments in the navigation target area and in which an average speed is equal to or smaller than a predetermined threshold. Although an example in which the area traffic condition index value and the route traffic condition index value are calculated for all vehicles in the navigation target area has been described in the present embodiment, the present invention is not limited thereto. For example, the values may be calculated for 80 percent or more of the vehicles in the navigation target area as long as the values can be calculated for all the vehicles in the navigation target area using the number of vehicles.

The guidance route determination unit 223 writes information indicating the calculated date to the area traffic condition index value table 234 of the storage unit 203 in correlation with the calculated area traffic condition index value.

The guidance route determination unit 223 calculates a travel time (hereinafter referred to as a vehicle travel time) predicted when each vehicle travels along a road segment included in the navigation area among the setting routes of the respective vehicles in the following manner, for example. The vehicle travel time is one of the route traffic condition index values of each vehicle. The guidance route determination unit 223 calculates the travel time predicted for the respective road segments included in the navigation target area among the setting routes of the respective vehicles. The guidance route determination unit 223 calculates the travel time of each road segment by dividing the length of the road segment by a spatial average speed of the road segment, for example. The spatial average speed is information based on the traffic condition evaluation value P3 for the spatial average speed. The guidance route determination unit 223 calculates the vehicle travel time by integrating the travel time of all road segments included in the navigation target area among the setting routes.

The guidance route determination unit 223 calculates the vehicle travel time for all vehicles in the navigation target area. The guidance route determination unit 223 calculates the total travel time which is one of the area traffic condition index values by integrating the vehicle travel time of all vehicles in the navigation target area.

The guidance route determination unit 223 calculates a congestion distance (hereinafter referred to as a vehicle congestion distance) predicted when each vehicle travels along a road segment included in the navigation area among the setting routes of the respective vehicles in the following manner, for example. The vehicle congestion distance is one of the route traffic condition index values of each vehicle. The guidance route determination unit 223 determines whether congestion is predicted for the respective road segments included in the navigation target area among the setting routes. For example, when the spatial average speed of each road segment is equal to or smaller than a predetermined threshold, the guidance route determination unit 223 determines that congestion is predicted for the road segment. The guidance route determination unit 223 calculates the vehicle congestion distance by integrating the lengths of the road segments for which it is determined that congestion is predicted.

The guidance route determination unit 223 calculates the vehicle congestion distance for all vehicles in the navigation target area. The guidance route determination unit 223 calculates the total congestion distance which is one of the area traffic condition index values by integrating the congestion distance for all vehicles in the navigation target area.

The guidance route determination unit 223 acquires the length of the road segment by referring to the map data 235 stored in the storage unit 203. The guidance route determination unit 223 acquires the spatial average speed based on the traffic condition evaluation value P3 for the spatial average speed by referring to the traffic condition evaluation value table 232 stored in the storage unit 203.

The guidance route determination unit 223 may calculate total energy consumption, a total toll amount, and the like as the area traffic condition index value. The total energy consumption is an integral value obtained by integrating the energy that each vehicle is predicted to consume when the vehicle travels along the setting route in the navigation target area for all vehicles in the navigation target area, for example. The energy may be the amount of electricity and the amount of gasoline. The total toll amount is an integral value obtained by integrating toll fees or the like charged to each vehicle when the vehicle travels along the setting route in the navigation target area for all vehicles in the navigation target area, for example.

The guidance route determination unit 223 optimizes the entire navigation target area by individually guiding the respective vehicles to routes for which the calculated area traffic condition index values are optimized. In the embodiment, the guidance route determination unit 223 optimizes the entire navigation target area by determining a route for which a degree of non-congestion based on the area traffic condition index value is the highest as the guidance route. The degree of non-congestion based on the area traffic condition index value is the degree indicating the level of a non-congestion state based on the area traffic condition index value. The non-congestion state is a road state in which, when each vehicle is observed, the vehicle can travel smoothly at a normal speed without being interruptted by other vehicles on the road and. In the embodiment, the degree of non-congestion increases as the state approaches a state in which there is no other vehicle around (for example, within 100 m from) each vehicle.

In the present embodiment, the degree of non-congestion based on the area traffic condition index value may be the sum or an integral value of a plurality of area traffic condition index values and may be a value calculated for each area traffic condition index value.

The optimization of the entire navigation target area facilitates smooth traffic flow. For example, it is possible to facilitate smooth traffic flow by decreasing an overall travel time of vehicles in the navigation target area and increasing the number of vehicles travelling smoothly. In the embodiment, the degree of non-congestion based on the area traffic condition index value increases as the travel time decreases. Smooth traffic flow can be facilitated by reducing overall congestion of the road segments included in the navigation target area. In the embodiment, the degree of non-congestion based on the area traffic condition index value increases as the congestion distance decreases. Smooth traffic flow can be facilitated by reducing overall energy consumption to reduce the traffic amount in the navigation target area. In the embodiment, the degree of non-congestion based on the area traffic condition index value increases as the energy consumption deceases. Smooth traffic flow can be facilitated by decreasing an overall amount of charged money such as a toll fee to reduce the traffic amount of toll roads included in the navigation target area. In the embodiment, the degree of non-congestion based on the area traffic condition index value increases as the amount of charged money decreases. Moreover, the optimization of the navigation target area may also improve the satisfaction of drivers. For example, an increase in the travel time in a long time span may be equalized and the amount of charged money in a long time span may be equalized.

In the embodiment, the guidance route determination unit 223 optimizes the navigation target area by optimizing the area traffic condition index values for the respective items. For example, the guidance route determination unit 223 determines a route in which the total travel time can be minimized, the total congestion distance can be minimized, the total energy consumption, or the total toll amount can be minimized (that is, a route in which the degree of non-congestion based on the area traffic condition index value is the highest) as the guidance route.

Here, when there is a road segment for which congestion is predicted in the setting route, the guidance route determination unit 223 determines a route which does not include the road segment for which congestion is predicted and in which the navigation target area is optimized as the guidance route. The guidance route determination unit 223 extracts a road segment (hereinafter referred to as a bottleneck road segment) in which a value based on the traffic condition evaluation value is lower than a reference value determined for each road segment as the road segment for which congestion is predicted. The guidance route determination unit 223 determines a route in which the degree of non-congestion based on the area traffic condition index value is the highest among the routes that do not include the bottleneck road segment as the guidance route.

The guidance route determination unit 223 calculates a bottleneck road segment included in the navigation target area on the basis of the traffic condition evaluation value calculated by the traffic condition calculation unit 222. More specifically, the guidance route determination unit 223 extracts a bottleneck road segment in which a value based on the traffic condition evaluation value is lower than an appropriate reference value stored in the appropriate reference value table 233 by referring to the appropriate reference value table 233 stored in the storage unit 203. The guidance route determination unit 223 determines that a road segment in which an integral value of P1, 1/P2, and P3 based on the traffic condition evaluation value, for example, is equal to or smaller than an appropriate reference value of the corresponding road segment is the bottleneck road segment. Without being limited thereto, the guidance route determination unit 223 may calculate a conversion value indicating that the traffic condition is good as the value increases and the traffic condition is bad as the value decreases on the basis of the traffic condition evaluation values P1 to P3 and determine that a road segment in which an integral value or the sum of the calculated conversion values is equal to or smaller than the appropriate reference value is the bottleneck road segment. Moreover, the guidance route determination unit 223 may weigh the traffic condition evaluation values P1 to P3 using a predetermined coefficient, compare a value based on the weighted values with the appropriate reference value, and determine whether the road segment is the bottleneck road segment on the basis of the comparison result.

The appropriate reference value table 233 includes appropriate reference values correlated with the respective road segments included in the navigation target area. The appropriate reference value is determined in advance according to the place and the shape (a width, linearity, and the like) of a road included in each road segment. For example, a value set for a road segment in which the road is narrow and crowded is lower than the appropriate reference value of a road segment having a standard shape. For example, a value set for a road segment in which the road is wide and is not crowded is higher than the appropriate reference value of the road segment having a standard shape.

When a bottleneck road segment is included in the setting route set in advance in the GNSS on-board unit 10, the guidance route determination unit 223 retrieves routes which are routes to the same destination and do not include the bottleneck road segment as candidate routes for the guidance route.

When one candidate route is obtained by retrieval, the guidance route determination unit 223 determines the candidate route obtained by the retrieval as a guidance route to be provided to the driver. When a plurality of candidate routes are obtained by the retrieval, the guidance route determination unit 223 determines a candidate route in which the degree of non-congestion based on the area traffic condition index value is the highest among all candidate routes as the guidance route.

The guidance route determination unit 223 may determine the guidance route regardless of the presence of the bottleneck road segment. For example, when the bottleneck road segment is included in the setting route, the guidance route determination unit 223 may retrieve routes which are routes to the same destination and in which the degree of non-congestion based on the area traffic condition index value is higher than that of the presently set setting route as candidate routes for the guidance route. When there are a number of candidate routes in which the degree of non-congestion based on the area traffic condition index value is higher than that of the presently set setting route, the guidance route determination unit 223 may determine a candidate route in which the degree of non-congestion based on the area traffic condition index value is the highest as the guidance route.

The guidance route determination unit 223 outputs information indicating the determined guidance route to the guidance route providing unit 224.

The route in which the degree of non-congestion based on the area traffic condition index value is higher than that of the presently set setting route is a route in which, when the area traffic condition index value is calculated by replacing a vehicle traffic condition index value of the candidate route with a vehicle traffic condition index value of the setting route, the degree of non-congestion based on the area traffic condition index value is higher than the degree of non-congestion based on the area traffic condition index value before replacement. Here, the area traffic condition index values before and after the replacement of the vehicle traffic condition index value of the candidate route with the vehicle traffic condition index value of the setting route will be referred to as an area traffic condition index value before replacement and an area traffic condition index value after replacement.

For example, the guidance route determination unit 223 subtracts a vehicle travel distance corresponding to the setting route from the total travel time which is one of the area traffic condition index values before replacement and adds the vehicle travel distance corresponding to the candidate route to calculate the total travel time which is one of the area traffic condition index values after replacement. Moreover, the guidance route determination unit 223 subtracts a vehicle congestion distance corresponding to the setting route from the total congestion distance which is one of the area traffic condition index values before replacement and adds the vehicle congestion distance corresponding to the candidate route to calculate the total congestion distance which is one of the area traffic condition index values after replacement.

For vehicles in which the setting route is not set, the vehicle travel time is not included in the total travel time and the vehicle congestion distance is not included in the total congestion distance. Due to this, the guidance route determination unit 223 adds the vehicle travel distance corresponding to the candidate route to the total travel time which is one of the area traffic condition index values before addition to calculate the total travel time which is one of the area traffic condition index values after addition. Moreover, the guidance route determination unit 223 adds the vehicle congestion distance corresponding to the candidate route to the total congestion distance which is one of the area traffic condition index values before addition to calculate the total congestion distance which is one of the area traffic condition index values after addition.

The guidance route determination unit 223 determines a candidate route in which the degree of non-congestion based on the area traffic condition index value after replacement is higher than the degree of non-congestion based on the area traffic condition index value before replacement as the guidance route. For example, the guidance route determination unit 223 determines a candidate route in which the total travel time is the shortest and the total congestion distance is the shortest as the guidance route.

Without being limited thereto, when there are two or more items of area traffic condition index values, the guidance route determination unit 223 may calculate one area traffic condition index value by applying a weight to respective items. For example, the guidance route determination unit 223 may calculate the sum of a value obtained by multiplying a determined weight by the total travel time and a value obtained by multiplying a determined weight by the total congestion distance as the degree of non-congestion based on the area traffic condition index value. The weight is determined in advance according to the item of the area traffic condition index value.

The guidance route providing unit 224 transmits information for providing guidance on the guidance route determined by the guidance route determination unit 223 to the GNSS on-board unit 10. When information indicating that the setting route is to be changed to the guidance route is returned from the GNSS on-board unit 10, the guidance route providing unit 224 rewrites the route of the vehicle information table 231 of the storage unit 203 to change the setting route of the GNSS on-board unit 10 to the guidance route.

(Process Flow of Traffic Demand Collection Unit 221)

Figure 4:
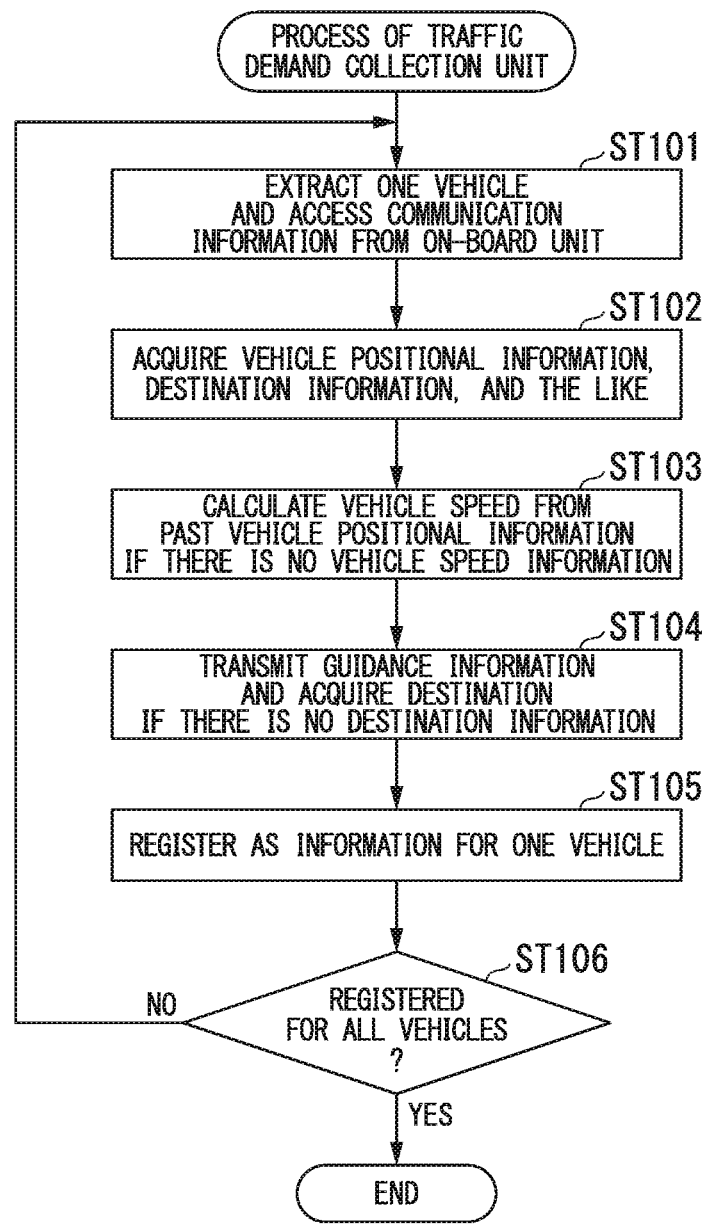
FIG. 4 is a flowchart for describing an example of a process flow of a traffic demand collection unit according to the first embodiment of the present invention.

Next, a process flow of the traffic demand collection unit 221 will be described with reference to FIG. 4. FIG. 4 is a flowchart for describing an example of the process flow of the traffic demand collection unit 221.

The traffic demand collection unit 221 extracts one GNSS on-board unit 10 in the navigation target area and accesses the communication information from the extracted GNSS on-board unit 10 (step ST101). The communication information from the GNSS on-board unit 10 may be stored in the storage unit 105 of the GNSS on-board unit 10 and may be stored in the storage unit 203 of the navigation server 20.

For example, the traffic demand collection unit 221 accesses the GNSS on-board unit 10 in the navigation target area to request transmission of the vehicle positional information, the date information, the identification information, the destination information, the vehicle speed information, and the setting route information. The traffic demand collection unit 221 may determine whether the GNSS on-board unit 10 is in the navigation target area on the basis of the vehicle positional information acquired from the GNSS on-board unit 10 in the past. Without being limited thereto, the traffic demand collection unit 221 may access the GNSS on-board unit 10 registered in advance to request transmission of the information. Moreover, the traffic demand collection unit 221 may not access the GNSS on-board unit 10 but the GNSS on-board unit 10 may periodically transmit information to the navigation server 20.

The traffic demand collection unit 221 acquires the vehicle positional information, the date information, the identification information, the destination information, the vehicle speed information, and the setting route information from the communication information from the GNSS on-board unit 10 (step ST102).

When there is no vehicle speed information corresponding to the acquired vehicle positional information, the traffic demand collection unit 221 calculates the vehicle speed of the vehicle on which the GNSS on-board unit 10 is mounted on the basis of the latest vehicle positional information and the most recent past vehicle positional information (step ST103).

When there is no destination information corresponding to the acquired vehicle positional information, the traffic demand collection unit 221 transmits guidance information for setting a destination to the GNSS on-board unit 10 (step ST104). The GNSS on-board unit 10 having received the guidance information transmits information indicating the destination selected by the driver to the navigation server 20. In this way, the traffic demand collection unit 221 acquires destination information corresponding to the vehicle positional information.

The traffic demand collection unit 221 writes the vehicle positional information, the date information, the identification information, the destination information, the vehicle speed information, and the setting route information in the vehicle information table 231 of the storage unit 203 in correlation as information for one vehicle (step ST105).

The traffic demand collection unit 221 determines whether the processes of steps ST101 to ST105 have been executed for all target GNSS on-board units 10 (step ST106). The traffic demand collection unit 221 repeats the processes by returning to step ST101 until the information from the GNSS on-board unit 10 is registered for all target GNSS on-board units 10.

(Process Flow of Traffic Condition Calculation Unit 222)

Figure 5:
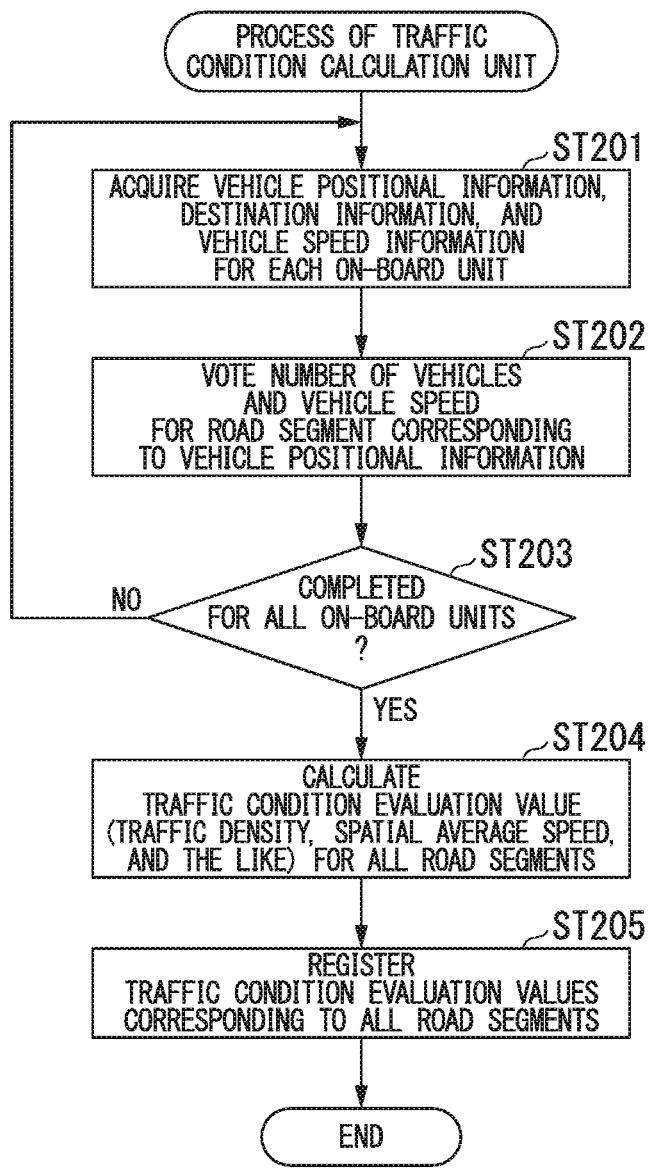
FIG. 5 is a flowchart for describing an example of a process flow of a traffic condition calculation unit according to the first embodiment of the present invention.

Next, the process flow of the traffic condition calculation unit 222 will be described with reference to FIG. 5. FIG. 5 is a flowchart for describing an example of the process flow of the traffic condition calculation unit 222.

The traffic condition calculation unit 222 reads the latest vehicle positional information, destination information, and vehicle speed information acquired from each GNSS on-board unit 10 from the vehicle information table 231 of the storage unit 203 (step ST201).

The traffic condition calculation unit 222 votes the number of vehicles and the vehicle speed for a road segment corresponding to the read vehicle positional information (step ST202). In other words, the traffic condition calculation unit 222 integrates the integral value of the number of vehicles on the road segment corresponding to the read vehicle positional information for one vehicle. Moreover, the traffic condition calculation unit 222 integrates a speed value indicated by the vehicle speed information for the integral value of the vehicle speed on the road segment corresponding to the read vehicle positional information.

The traffic condition calculation unit 222 determines whether the processes of steps ST201 to ST202 have been executed for all target GNSS on-board units 10 (step ST203). The traffic condition calculation unit 222 repeats the processes by returning to step ST201 until the number of vehicles and the vehicle speed for the road segment are voted for all target GNSS on-board units 10.

When the processes of steps ST201 to ST202 have been executed for all target GNSS on-board units 10, the traffic condition calculation unit 222 calculates the traffic condition evaluation value of each road segment (step ST204). More specifically, the traffic condition calculation unit 222 calculates the traffic density corresponding to each road segment by dividing the number of vehicles on each road segment voted in step ST202 by the road length of each road segment. The calculated traffic density corresponds to the traffic condition evaluation value P2. Moreover, the traffic condition calculation unit 222 calculates the spatial average speed corresponding to each road segment by dividing the integral value of the vehicle speed on each road segment voted in step ST202 by the number of vehicles on each road segment. The calculated spatial average speed corresponds to the traffic condition evaluation value P3.

Here, the traffic condition calculation unit 222 calculates the temporal traffic amount which is the number of vehicles passing per hour on each road segment on the basis of the number of vehicles on each road segment in the past. The calculated temporal traffic amount corresponds to the traffic condition evaluation value P1.

The traffic condition calculation unit 222 writes the information (for example, the link ID) indicating each road segment and the date information indicating the date on which the traffic condition evaluation values P1 to P3 were calculated in the traffic condition evaluation value table 232 of the storage unit 203 in correlation with the calculated traffic condition evaluation values P1 to P3 (step ST205).

(Process Flow of Guidance Route Determination Unit 223)

Figure 6:
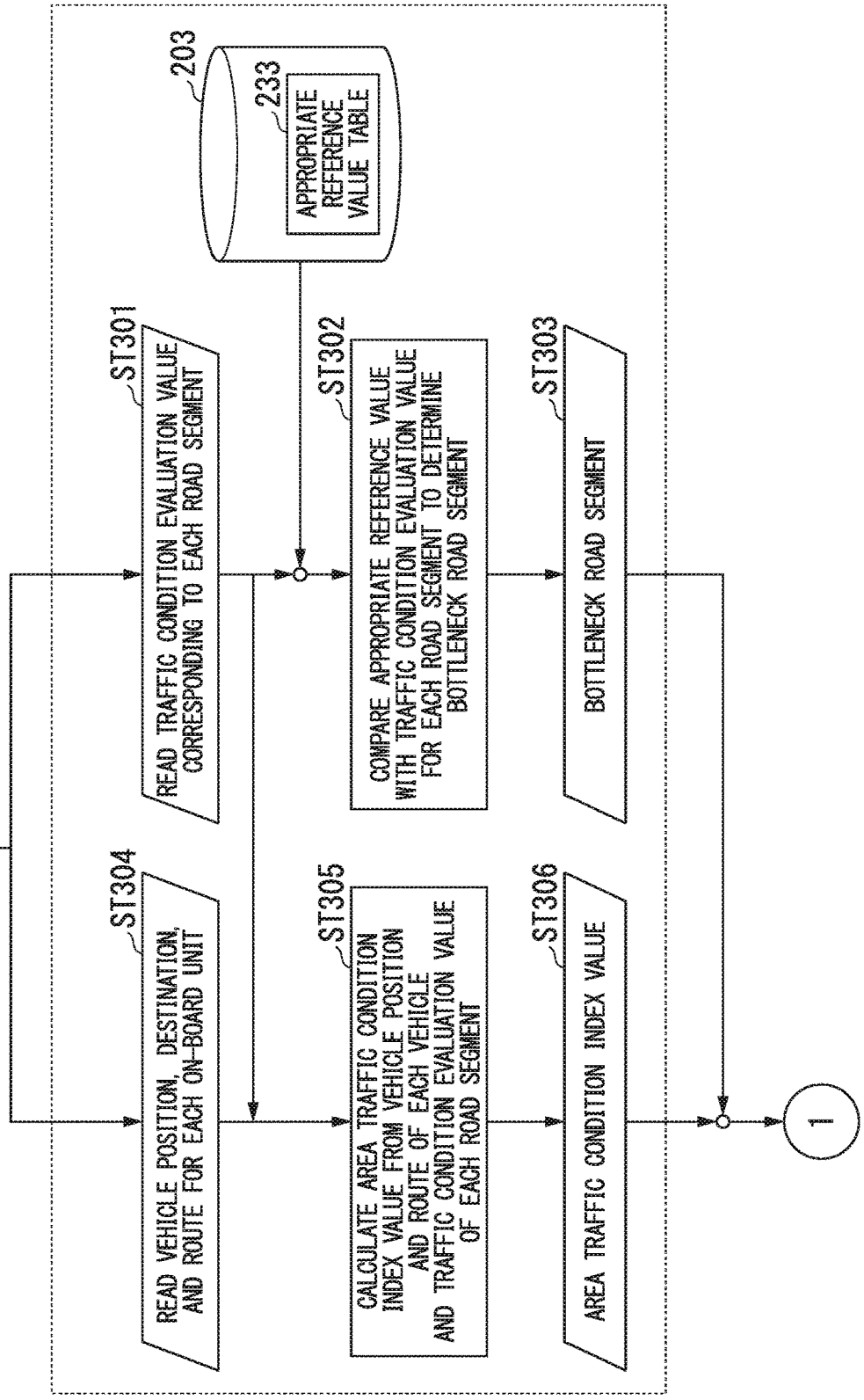
FIG. 6 is a flowchart for describing an example of a process flow of a guidance route determination unit according to the first embodiment of the present invention.
Figure 7:
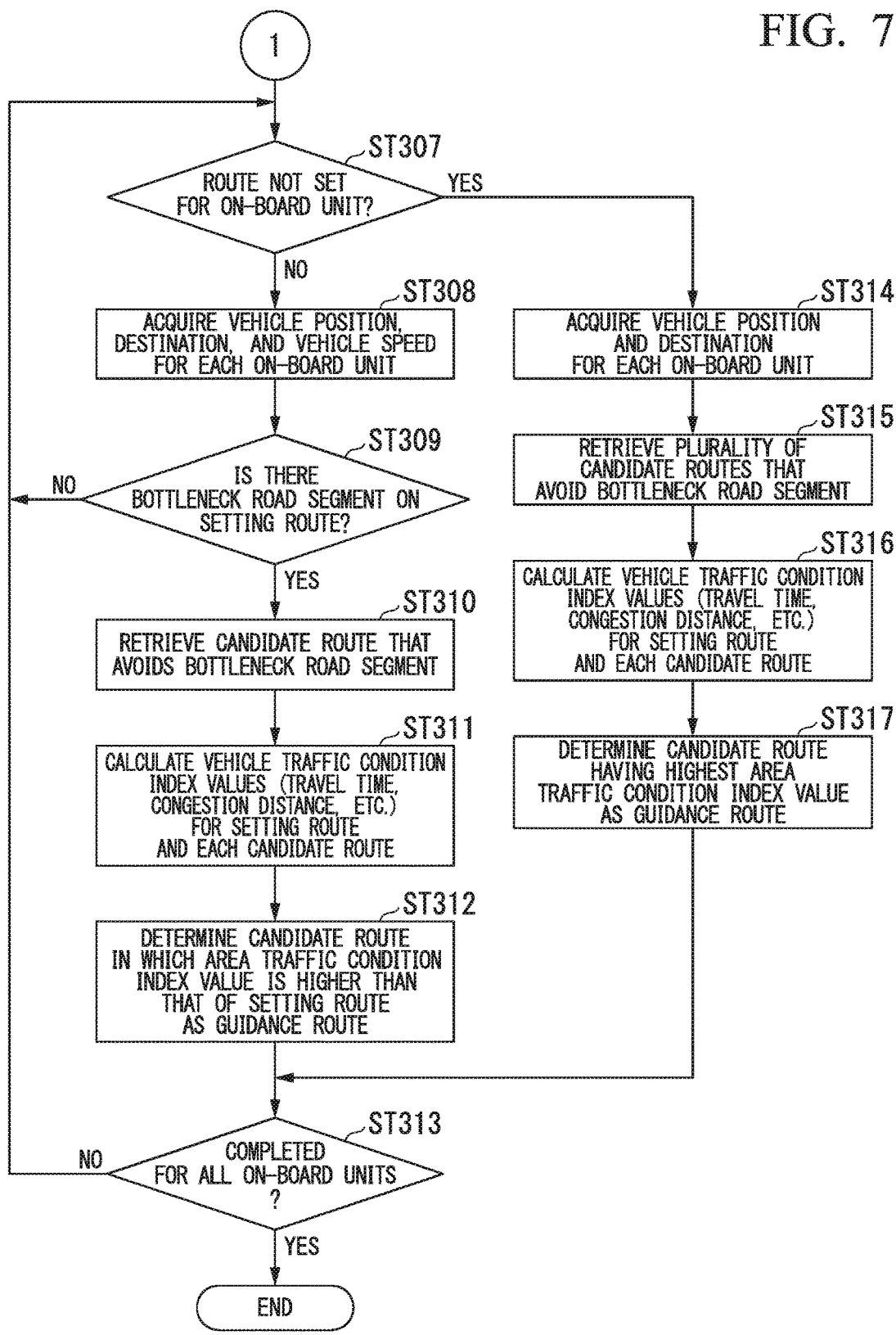
FIG. 7 is a flowchart for describing an example of a process flow of the guidance route determination unit according to the first embodiment of the present invention.

Next, the process flow of the guidance route determination unit 223 will be described with reference to FIGS. 6 and 7. FIGS. 6 and 7 are flowcharts for describing an example of the process flow of the guidance route determination unit 223.

The guidance route determination unit 223 reads the traffic condition evaluation values P1 to P3 corresponding to each road segment from the traffic condition evaluation value table 232 (step ST301). When a plurality of traffic condition evaluation values P1 to P3 are stored in the traffic condition evaluation value table 232, the guidance route determination unit 223 reads the latest traffic condition evaluation values P1 to P3 on the basis of the date on which the traffic condition evaluation values P1 to P3 were calculated.

The guidance route determination unit 223 compares the integral value of P1, 1/P2, and P3 based on the traffic condition evaluation value with the appropriate reference value of the corresponding road segment by referring to the appropriate reference value table 233. When the integral value of the traffic condition evaluation value is equal to or smaller than the appropriate reference value, the guidance route determination unit 223 determines that the road segment is a bottleneck road segment (step ST302).

The guidance route determination unit 223 temporarily stores information indicating the road segment determined to be the bottleneck road segment in the storage unit 203 (step ST303).

The guidance route determination unit 223 reads the latest vehicle positional information corresponding to each GNSS on-board unit 10 and the setting route information from the vehicle information table 231 (step ST304).

The guidance route determination unit 223 calculates the area traffic condition index value indicating the traffic condition in the entire route on the basis of the information read in step ST304 and the traffic condition evaluation values P1 to P3 read in step ST301 (step ST305). The guidance route determination unit 223 calculates the total travel time and the total congestion distance as the area traffic condition index value, for example.

The guidance route determination unit 223 writes the date information indicating the date of calculation in the area traffic condition index value table 234 of the storage unit 203 in correlation with the calculated area traffic condition index value (step ST306).

Subsequently, the guidance route determination unit 223 extracts one GNSS on-board unit 10 on the basis of the identification information correlated with the vehicle positional information read from the vehicle information table 231 and determines whether the setting route to the destination has been set for the GNSS on-board unit 10 (step ST307). For example, when the setting route information is not correlated with the latest vehicle positional information correlated with the extracted GNSS on-board unit 10 in the vehicle information table 231, it is determined that the route to the destination has not been set.

When it is determined that the setting route to the destination has been set, the guidance route determination unit 223 reads the vehicle positional information, the destination information, and the vehicle speed information corresponding to the GNSS on-board unit 10 from the vehicle information table 231 (step ST308).

The guidance route determination unit 223 determines whether a bottleneck road segment is included in the route on the basis of the read setting route information (step ST309).

When it is determined that the bottleneck road segment is not included, the guidance route determination unit 223 returns to step ST307 and repeats the processes.

On the other hand, when it is determined that the bottleneck road segment is included, the guidance route determination unit 223 retrieves candidate routes to the destination which avoids the bottleneck road segment by referring to the map data 235 (step ST310).

The guidance route determination unit 223 calculates the vehicle traffic condition index value for the setting route and the vehicle traffic condition index value for each candidate route (step ST311).

The guidance route determination unit 223 determines a route in which the degree of non-congestion based on the area traffic condition index value is higher than that of the presently set setting route among the candidate routes as the guidance route (step S312). The guidance route determination unit 223 outputs information indicating the determined guidance route to the guidance route providing unit 224. Moreover, the guidance route determination unit 223 writes the information indicating the determined guidance route, the date information indicating the date on which the guidance route was determined, and the identification information indicating the GNSS on-board unit 10 for which the guidance route was determined in the guidance route table 236 of the storage unit 203 in correlation.

The guidance route determination unit 223 determines whether the process of step ST307 has been executed for all target GNSS on-board units 10 (step ST313). The guidance route determination unit 223 repeats the processes by returning to step ST307 until the process of step ST307 is executed for all target GNSS on-board units 10.

When it is determined in step ST307 that the route to the destination has not been set for the GNSS on-board unit 10, the guidance route determination unit 223 reads the latest vehicle positional information corresponding to the GNSS on-board unit 10 and the destination information from the vehicle information table 231 (step ST314).

The guidance route determination unit 223 retrieves a plurality of candidate routes that avoid the bottleneck road segment as the route to the destination from the current position indicated by the vehicle positional information by referring to the map data 235 (step ST315).

The guidance route determination unit 223 calculates the vehicle traffic condition index value for each candidate route (step ST316).

The guidance route determination unit 223 determines a route in which the degree of non-congestion based on the area traffic condition index value is the highest among the plurality of candidate routes on the basis of the calculated vehicle traffic condition index value as the guidance route (step ST317).

The guidance route determination unit 223 outputs information indicating the determined guidance route to the guidance route providing unit 224. The guidance route determination unit 223 outputs the information indicating the determined guidance route to the guidance route providing unit 224. Moreover, the guidance route determination unit 223 writes the information indicating the determined guidance route, the date information indicating the date on which the guidance route was determined, and the identification information indicating the GNSS on-board unit 10 for which the guidance route was determined in the guidance route table 236 of the storage unit 203 in correlation.

(Process Flow of Guidance Route Providing Unit 224)

Figure 8:
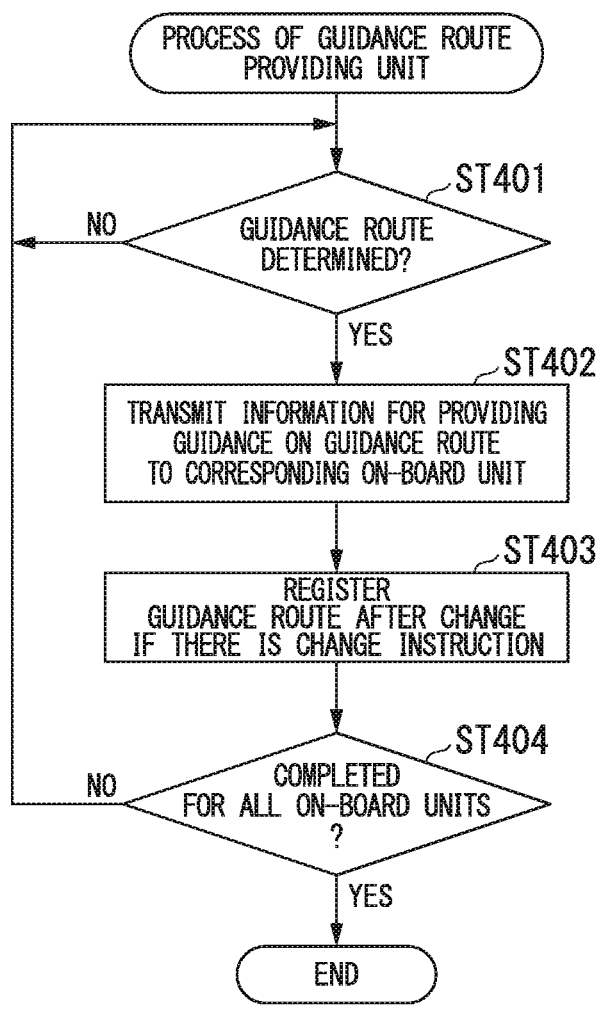
FIG. 8 is a flowchart for describing an example of a process flow of a guidance route providing unit according to the first embodiment of the present invention.

Next, the process flow of the guidance route providing unit 224 will be described with reference to FIG. 8. FIG. 8 is a flowchart for describing an example of the process flow of the guidance route providing unit 224.

The guidance route providing unit 224 determines whether the guidance route has been provided by referring to the guidance route table 236 (step ST401). The guidance route table 236 has a field in which flag information indicating whether the guidance route has been provided to the GNSS on-board unit 10 is written and which is provided in correlation with information or the like indicating the guidance route. When the information indicating that the guidance route has been provided is not stored in the flag information field by referring to the guidance route table 236, the guidance route providing unit 224 determines that the guidance route has not been provided.

When it is determined that the guidance route has not been provided, the guidance route providing unit 224 transmits information for providing guidance on the guidance route determined by the guidance route determination unit 223 to the GNSS on-board unit 10 (step ST402).

When information indicating that the guidance route is to be changed is returned from the GNSS on-board unit 10, the guidance route providing unit 224 writes information indicating the guidance route in the field of the route information corresponding to the identification information of the GNSS on-board unit 10 in the vehicle information table 231 of the storage unit 203 (step ST403). Moreover, the guidance route providing unit 224 may write information indicating that the guidance route on which guidance is provided has been set for the GNSS on-board unit 10 instead of the route set in advance in the guidance route table 236. The guidance route table 236 has a field in which flag information indicating whether the setting route has been changed to the guidance route is written and which is provided in correlation with the information or the like indicating the guidance route.

The guidance route providing unit 224 determines whether the process of step ST401 has been executed for all target GNSS on-board units 10 (step ST404). The guidance route providing unit 224 repeats the processes by returning to step ST401 until the process of step ST401 is executed for all target GNSS on-board units 10.

Second Embodiment

Figure 9:
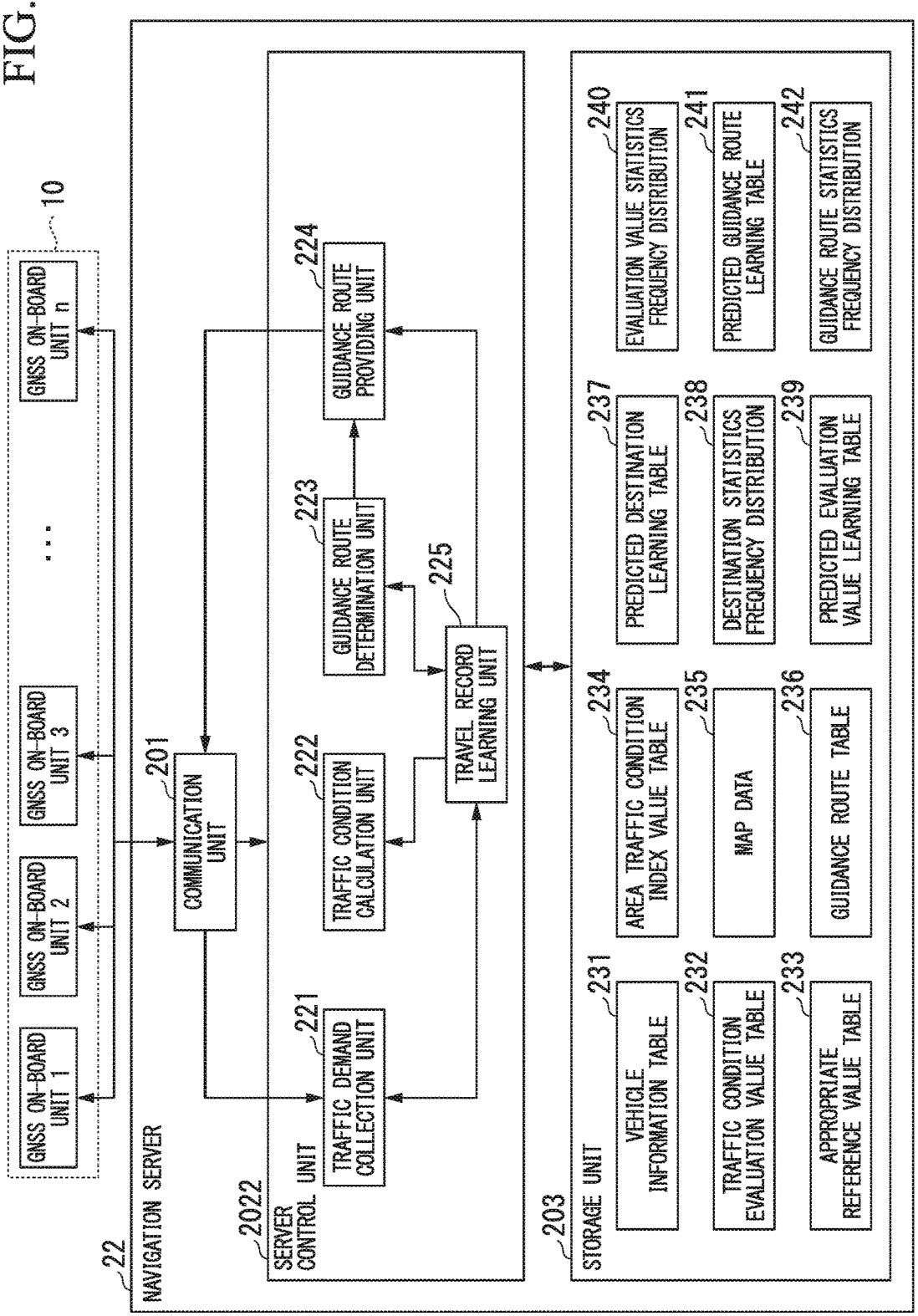
FIG. 9 is a schematic diagram illustrating an example of a navigation system according to a second embodiment of the present invention.

Next, an example of a navigation system 2 according to a second embodiment will be described. FIG. 9 is a schematic diagram illustrating an example of the navigation system 2 according to the second embodiment. The constituent elements similar to those included in the navigation system 1 according to the first embodiment will be denoted by the same reference numerals and the detailed description thereof will not be provided.

The navigation system 2 includes a plurality of GNSS on-board units 10 and a navigation server 22. The navigation server 22 includes a communication unit 201, a server control unit 2022, and a storage unit 203. The server control unit 2022 is a CPU, for example, and controls the navigation server 22 in an integrated manner. The navigation server 22 includes a traffic demand collection unit 221, a traffic condition calculation unit 222, a guidance route determination unit 223, a guidance route providing unit 224, and a travel record learning unit 225 as functional units that function when the server control unit 2022 which is a CPU executes programs. Some or all of these functional units may be a hardware function unit such as an LSI or an ASIC.

The travel record learning unit 225 executes a learning phase and a prediction phase. The learning phase is a process step of accumulating information acquired and generated by the server control unit 2022 to learn a statistics frequency distribution on the basis of the accumulated information. The prediction phase is a process step of predicting information acquired and generated by the server control unit 2022 on the basis of the statistics frequency distribution.

In the embodiment, the travel record learning unit 225 executes a learning phase and a prediction phase for a destination, a learning phase and a prediction phase for a traffic condition evaluation value, and a learning phase and a prediction phase for a guidance route.

(Destination Learning and Prediction Process)

The travel record learning unit 225 executes a destination learning phase in the following manner, for example.

The travel record learning unit 225 reads the vehicle positional information, the date information, the identification information, and the destination information with which the same identification information is correlated from the vehicle information table 231 on the basis of the identification information and writes the same in the predicted destination learning table 237 of the storage unit 203 in correlation. The travel record learning unit 225 may create the predicted destination learning table 237 for respective items of identification information. The travel record learning unit 225 may update the predicted destination learning table 237 on the basis of all items of information stored in the vehicle information table 231.

The travel record learning unit 225 may write the guidance route provided to the GNSS on-board unit 10 by the guidance route providing unit 224 in the predicted destination learning table 237. The travel record learning unit 225 writes the date information indicating the date on which the guidance route was provide, the identification information indicating the GNSS on-board unit 10 for which the guidance route was provided, and the vehicle positional information indicating a departure point included in the guidance route in the predicted destination learning table 237 in correlation with the guidance route, for example.

The travel record learning unit 225 calculates the statistics frequency distribution of the destination actually set in the past for respective time periods, respective days of the week, and respective departure points. The travel record learning unit 225 writes the calculated destination statistics frequency distribution to the destination statistics frequency distribution 238 of the storage unit 203. When the predicted destination learning table 237 is updated, the travel record learning unit 225 calculates the destination statistics frequency distribution again to update the destination statistics frequency distribution 238. In this way, the destination statistics frequency distribution is learned.

Figure 10:
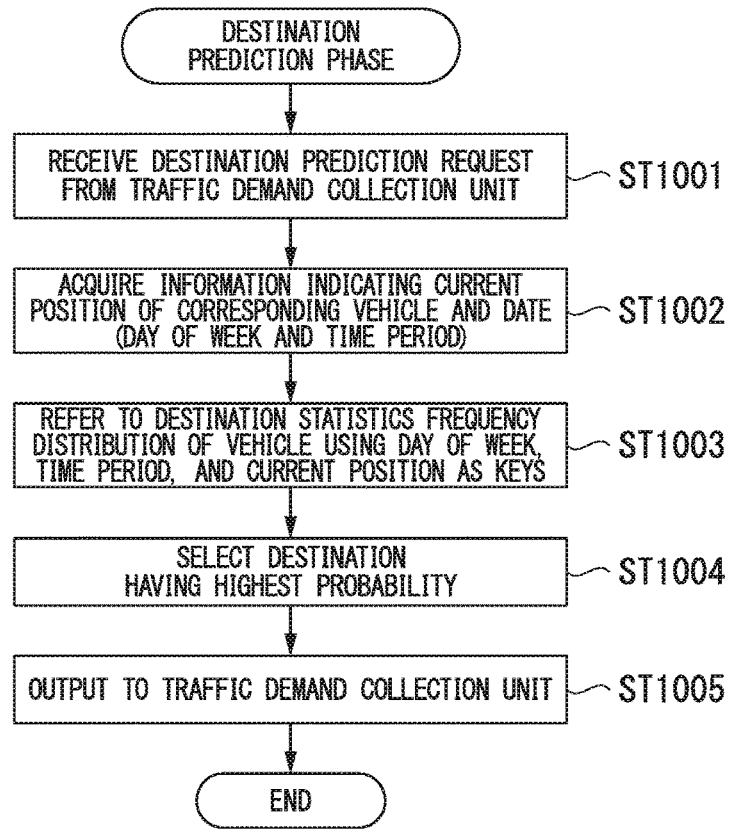
FIG. 10 is a flowchart for describing an example of a destination prediction phase.

Next, a destination prediction phase of the travel record learning unit 225 will be described with reference to FIG. 10. FIG. 10 is a flowchart for describing an example of the destination prediction phase of the travel record learning unit 225.

The travel record learning unit 225 receives a destination prediction request from the traffic demand collection unit 221 (step ST1001).

The travel record learning unit 225 acquires the vehicle positional information of the GNSS on-board unit 10 when the destination prediction request was received from the traffic demand collection unit 221 (step ST1002). For example, the travel record learning unit 225 acquires the vehicle positional information written to the vehicle information table 231 by the traffic demand collection unit 221 when the prediction request was received. Moreover, the travel record learning unit 225 acquires information indicating the date (the day of the week and a time period) when the destination prediction request was received from the traffic demand collection unit 221.

The travel record learning unit 225 retrieves a destination having the largest number (highest frequency) among the destinations corresponding to a key by referring to the destination statistics frequency distribution 238 using the information acquired in step ST1002 as the key (step ST1003). That is, the travel record learning unit 225 retrieves a destination having the largest number (highest frequency) using the current position, the current day of the week, and the current time period of the GNSS on-board unit 10 as keys.

When the plurality of destinations obtained by the retrieval based on the respective keys are different, the numbers of destinations in the destination statistics frequency distribution 238 are compared, and a destination having the largest number is obtained by retrieval.

The travel record learning unit 225 selects a destination obtained by the retrieval (that is, a destination having the highest probability) as a predicted destination (step ST1004).

The travel record learning unit 225 outputs the destination selected as the predicted destination to the traffic demand collection unit 221 (step ST1005).

(Traffic Condition Evaluation Value Learning and Prediction Process)

The travel record learning unit 225 executes a traffic condition evaluation value learning phase in the following manner, for example.

The travel record learning unit 225 reads the traffic condition evaluation values P1 to P3 with which the same link ID is correlated and the date information from the traffic condition evaluation value table 232 on the basis of the link ID and writes the same in the predicted evaluation value learning table 239 of the storage unit 203 in correlation. The travel record learning unit 225 may create the predicted evaluation value learning table 239 for the respective link IDs. The travel record learning unit 225 may update the predicted evaluation value learning table 239 on the basis of all items of information stored in the vehicle information table 231.

The travel record learning unit 225 calculates the statistics frequency distribution of the traffic condition evaluation value actually set in the past for respective time periods and respective days of the week. The travel record learning unit 225 writes the calculated traffic condition evaluation value statistics frequency distribution to the evaluation value statistics frequency distribution 240 of the storage unit 203. When the predicted evaluation value learning table 239 is updated, the travel record learning unit 225 calculates the traffic condition evaluation value statistics frequency distribution again and updates the evaluation value statistics frequency distribution 240. In this way, the traffic condition evaluation value statistics frequency distribution is learned.

Figure 11:
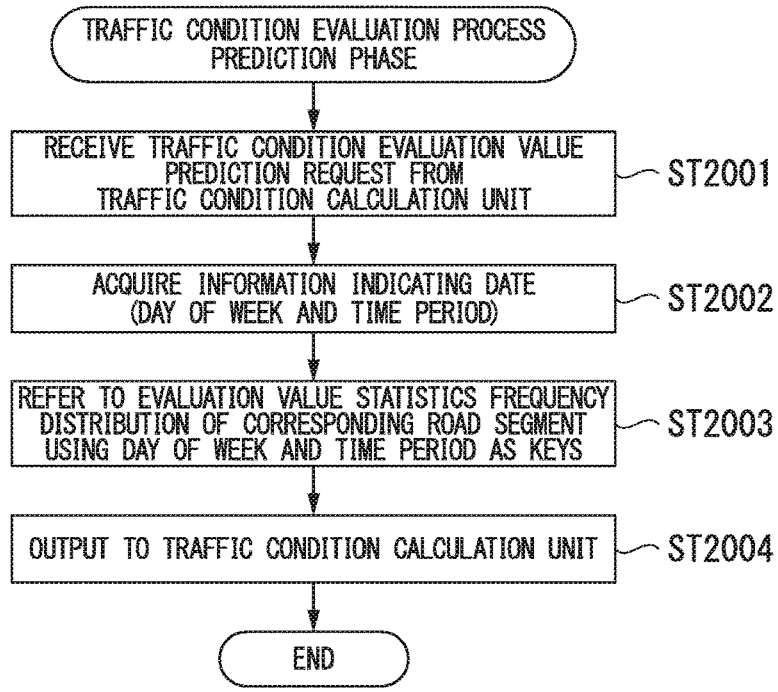
FIG. 11 is a flowchart for describing an example of a traffic condition evaluation value prediction phase.

Next, a traffic condition evaluation value prediction phase of the travel record learning unit 225 will be described with reference to FIG. 11. FIG. 11 is a flowchart for describing an example of the traffic condition evaluation value prediction phase of the travel record learning unit 225.

The travel record learning unit 225 receives a traffic condition evaluation value prediction request from the traffic condition calculation unit 222 (step ST2001).

The travel record learning unit 225 acquires information (link ID) indicating a target road segment when the traffic condition evaluation value prediction request was received from the traffic condition calculation unit 222 (step ST2002). Moreover, the travel record learning unit 225 acquires information indicating the date (the day of the week and a time period) when the traffic condition evaluation value prediction request was received from the traffic condition calculation unit 222.

The travel record learning unit 225 retrieves a traffic condition evaluation value having a largest number (highest frequency) among the traffic condition evaluation values corresponding to keys by referring to the evaluation value statistics frequency distribution 240 using information acquired in step ST2002 as the keys (step ST2003). That is, the travel record learning unit 225 retrieves the traffic condition evaluation value having the largest number (highest frequency) using the road segment, the day of the week, and the time period as keys.

When the plurality of traffic condition evaluation values obtained by the retrieval based on the keys are different, the numbers of traffic condition evaluation values in the evaluation value statistics frequency distribution 240 are compared, and a traffic condition evaluation value having the largest number is obtained by retrieval.

The travel record learning unit 225 selects the traffic condition evaluation value obtained by the retrieval (that is, the traffic condition evaluation value having the highest frequency calculated as the traffic condition evaluation value in the road segment) as a predicted traffic condition evaluation value.

The travel record learning unit 225 outputs the traffic condition evaluation value selected as the predicted traffic condition evaluation value to the traffic condition calculation unit 222 (step ST2004).

(Guidance Route Learning and Prediction Process)

The travel record learning unit 225 executes a guidance route learning phase in the following manner, for example.

The travel record learning unit 225 writes a guidance route set in the GNSS on-board unit 10 among the guidance routes provided to the GNSS on-board unit 10 by the guidance route providing unit 224 in the predicted guidance route learning table 241. The travel record learning unit 225 writes the date information indicating the date when the guidance route was provided (or set), the identification information indicating the GNSS on-board unit 10 for which the guidance route was provided, and the vehicle positional information indicating the departure point included in the guidance route in the predicted guidance route learning table 241 in correlation with the information indicating the guidance route.

The travel record learning unit 225 calculates the statistics frequency distribution of the guidance route actually set in the past for respective time periods, respective days of the week, and respective departure points. The travel record learning unit 225 writes the calculated guidance route statistics frequency distribution as the guidance route statistics frequency distribution 242 of the storage unit 203. When the predicted guidance route learning table 241 is updated, the travel record learning unit 225 calculates the guidance route statistics frequency distribution again and updates the guidance route statistics frequency distribution 242.

Figure 12:
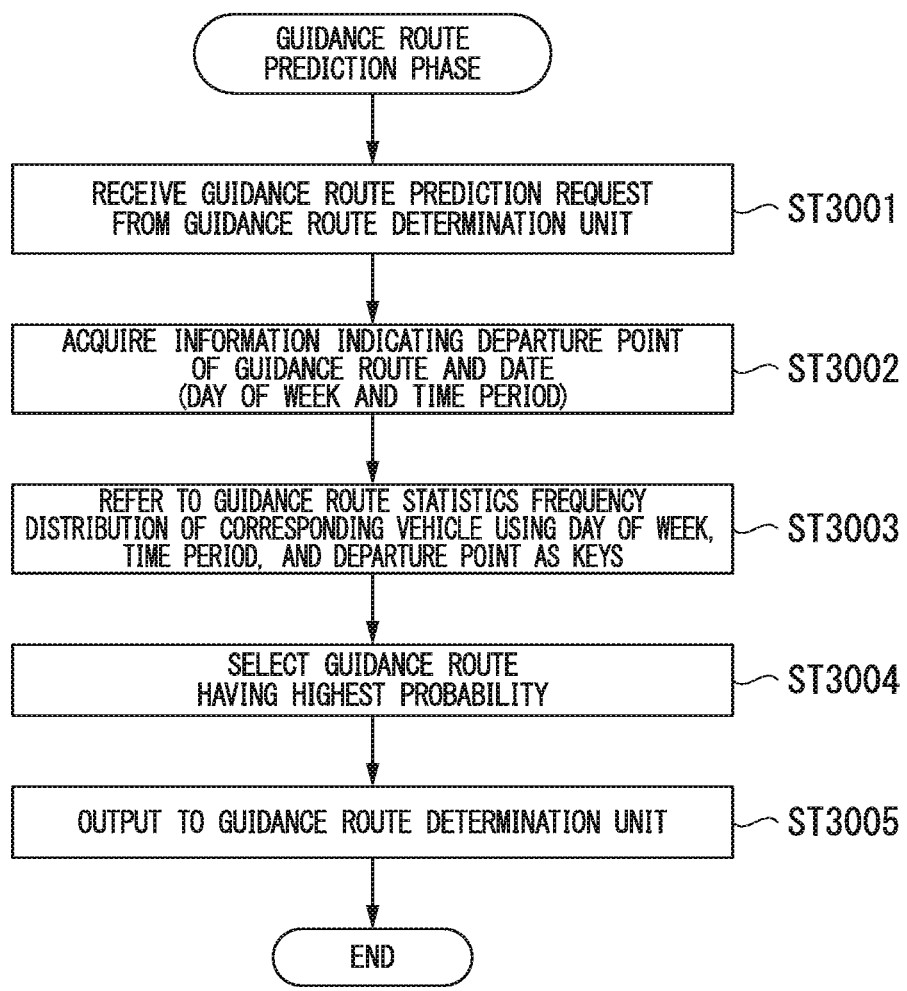
FIG. 12 is a flowchart for describing an example of a guidance route prediction phase.

Next, a guidance route prediction phase of the travel record learning unit 225 will be described with reference to FIG. 12. FIG. 12 is a flowchart for describing an example of the guidance route prediction phase of the travel record learning unit 225.

The travel record learning unit 225 receives a guidance route prediction request from the guidance route determination unit 223 (step ST3001).

The travel record learning unit 225 acquires the vehicle positional information indicating the departure point included in the guidance route from the guidance route determination unit 223 (step ST3002). Moreover, the travel record learning unit 225 acquires information indicating the date (the day of the week and a time period) when the guidance route prediction request was received from the guidance route determination unit 223.

The travel record learning unit 225 retrieves a guidance route having a largest number (highest frequency) among the guidance routes corresponding to keys by referring to the guidance route statistics frequency distribution 242 using the information acquired in step ST3002 as the keys (step ST3003). That is, the travel record learning unit 225 retrieves the guidance route having the largest number (highest frequency) using the departure point, the day of the week, and the time period of departure of the GNSS on-board unit 10 as keys.

When the plurality of guidance routes obtained by the retrieval based on the respective keys are different, the numbers of guidance routes in the guidance route statistics frequency distribution 242 are compared and the guidance route having the largest number is obtained by retrieval.

The travel record learning unit 225 selects a guidance route obtained by the retrieval (that is, a guidance route having the highest probability) as a predicted guidance route (step ST3004).

The travel record learning unit 225 outputs a guidance route selected as the predicted guidance route to the guidance route determination unit 223 (step ST3005).

(Process Flow of Traffic Demand Collection Unit 221).

Figure 13:
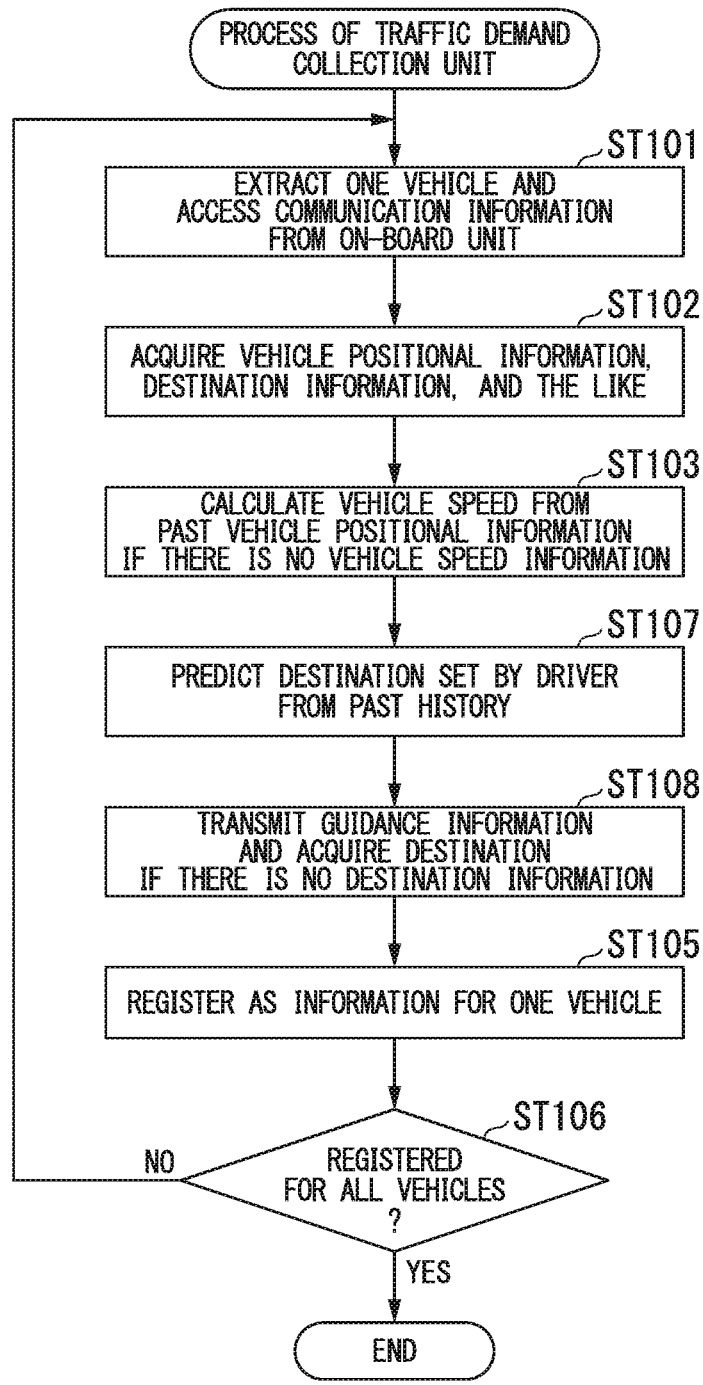
FIG. 13 is a flowchart for describing an example of a process flow of a traffic demand collection unit according to the second embodiment of the present invention.

Next, a process flow of the traffic demand collection unit 221 will be described with reference to FIG. 13. FIG. 13 is a flowchart for describing an example of a process flow of the traffic demand collection unit 221.

Since steps ST101 to ST103, ST105, and ST106 are the same as those of the above-described processes, the detailed description thereof will not be provided. Moreover, in the present embodiment, the traffic demand collection unit 221 executes step ST108 instead of step ST104.

In step ST103, the traffic demand collection unit 221 outputs the destination prediction request to the travel record learning unit 225.

The travel record learning unit 225 receives a prediction request and predicts a destination set by the driver corresponding to the GNSS on-board unit 10 extracted in step ST101 (step ST107). That is, the travel record learning unit 225 executes the prediction phase for the destination. More specifically, the travel record learning unit 225 retrieves a destination having the largest number (highest frequency) among the destinations corresponding to keys by referring to the destination statistics frequency distribution 238 using the identification information of the GNSS on-board unit 10 extracted in step ST101 as the keys. Here, the travel record learning unit 225 may retrieve the destination having the largest number (highest frequency) using the information indicating the date (the day of the week and a time period) when the destination prediction request was received from the traffic demand collection unit 221 as keys in addition to the identification information of the GNSS on-board unit 10. The travel record learning unit 225 outputs the predicted destination obtained by the retrieval to the traffic demand collection unit 221.

Subsequently, the traffic demand collection unit 221 presents the predicted destination predicted by the travel record learning unit 225 as the guidance information for acquiring the destination and transmits a selection screen that requests the driver to select whether or not to set the presented predicted destination to the GNSS on-board unit 10 (step ST108). The traffic demand collection unit 221 may also transmit the guidance information described in the first embodiment to the GNSS on-board unit 10.

(Process Flow of Traffic Condition Calculation Unit 222)

Figure 14:
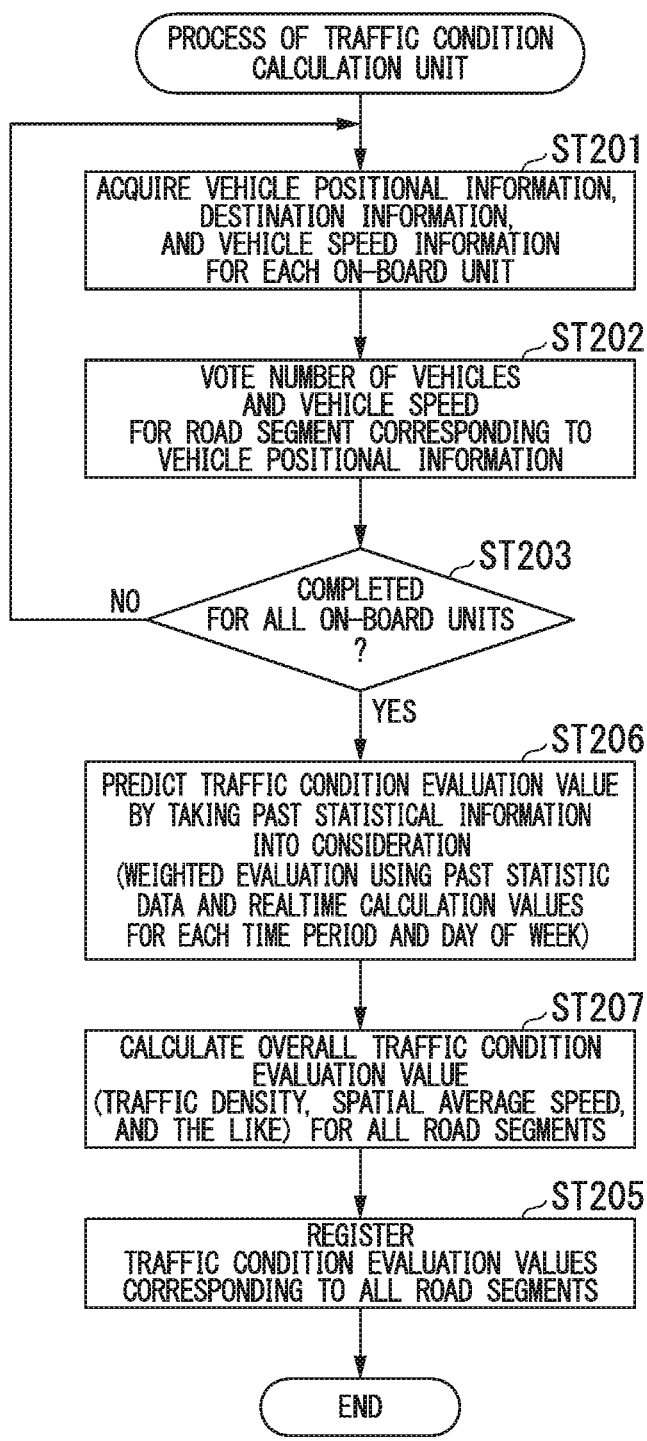
FIG. 14 is a flowchart for describing an example of a process flow of a traffic condition calculation unit according to the second embodiment of the present invention.

Next, the process flow of the traffic condition calculation unit 222 will be described with reference to FIG. 14. FIG. 14 is a flowchart for describing an example of the process flow of the traffic condition calculation unit 222.

Since steps ST201 to ST203 and ST205 are the same as those of the above-described processes, the detailed description thereof will not be provided. Moreover, in the present embodiment, the traffic condition calculation unit 222 executes step ST207 instead of step ST204.

When it is determined in step ST203 that the processes of steps ST201 to ST202 have been executed for all target GNSS on-board units 10, the traffic condition calculation unit 222 outputs a traffic condition evaluation value prediction request to the travel record learning unit 225.

The travel record learning unit 225 receives the prediction request and predicts the traffic condition evaluation value for the road segment corresponding to one item of vehicle positional information read in step ST201 (step ST206). That is, the travel record learning unit 225 executes the prediction phase for the above-described traffic condition evaluation value. More specifically, the travel record learning unit 225 retrieves the traffic condition evaluation value having the largest number (highest frequency) among the traffic condition evaluation values corresponding to keys by referring to the evaluation value statistics frequency distribution 240 using the link ID of the road segments corresponding to one item of vehicle positional information read in step ST201 as the keys. Here, the travel record learning unit 225 may retrieve the traffic condition evaluation value having the largest number (highest frequency) using the information indicating the date (the day of the week and a time period) when the traffic condition evaluation value prediction request was received from the traffic condition calculation unit 222 as keys. The travel record learning unit 225 outputs the traffic condition evaluation value obtained by retrieval to the traffic condition calculation unit 222.

Subsequently, the traffic condition calculation unit 222 calculates an overall traffic condition evaluation value corresponding to the respective road segments on the basis of both the traffic condition evaluation value corresponding to a current situation and the predicted traffic condition evaluation value (step ST207). The traffic condition evaluation value corresponding to the current situation is a traffic condition evaluation value calculated by the traffic condition calculation unit 222 in the first embodiment.

The traffic condition calculation unit 222 calculates the overall traffic condition evaluation value by applying a weight corresponding to the predicted traffic condition evaluation value to the traffic condition evaluation value corresponding to the current situation, for example. The weight corresponding to the predicted traffic condition evaluation value is determined in advance depending on the number of vehicles passing per hour in each road segment, the traffic density corresponding to each road segment, and the spatial average speed corresponding to each road segment, for example. When the predicted traffic condition evaluation value indicates that the traffic condition is bad, the traffic condition calculation unit 222 performs weighting such that the traffic condition of the traffic condition evaluation value corresponding to the current situation worsens. In contrast, when the predicted traffic condition evaluation value indicates that the traffic condition is good, the traffic condition calculation unit 222 performs weighting such that the traffic condition of the traffic condition evaluation value corresponding to the current situation is improved.

(Process Flow of Guidance Route Determination Unit 223)

Figure 15:
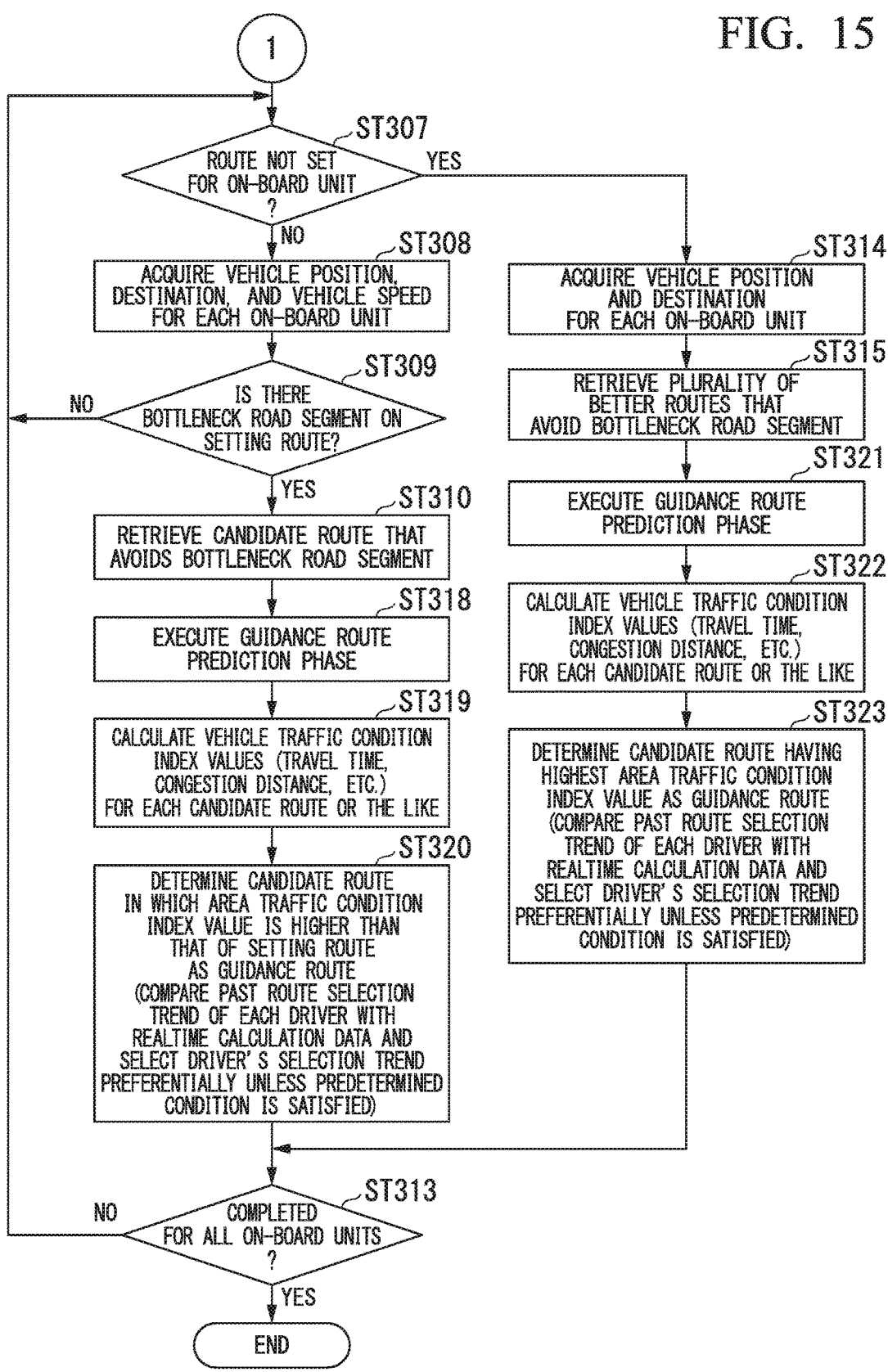
FIG. 15 is a flowchart for describing an example of a process flow of a guidance route determination unit according to the second embodiment of the present invention.

Next, the process flow of the guidance route determination unit 223 will be described with reference to FIG. 15. FIG. 15 is a flowchart for describing an example of the process flow of the guidance route determination unit 223.

Since steps ST307 to ST310 and ST313 to ST315 are the same as the above-described processes, the detailed description thereof will not be provided. In the present embodiment, the guidance route determination unit 223 executes step ST319 instead of step ST311, step ST320 instead of step ST312, step ST322 instead of step ST316, and step ST323 instead of step S317.

In step ST310, after retrieving a candidate route to a destination which avoids the bottleneck road segment, the guidance route determination unit 223 outputs the guidance route prediction request to the travel record learning unit 225.

The travel record learning unit 225 receives the prediction request and predicts the guidance route for the identification information correlated with the vehicle positional information read in step ST307 (step ST318). That is, the travel record learning unit 225 executes the prediction phase for the above-described guidance route. More specifically, the travel record learning unit 225 retrieves the guidance route having the largest number (highest frequency) among the guidance routes corresponding to keys by referring to the guidance route statistics frequency distribution 242 using items of the identification information correlated with the vehicle positional information read in step ST307 as the keys. Here, the travel record learning unit 225 may retrieve the guidance route having the largest number (highest frequency) using the information indicating the date (the day of the week and a time period) when the guidance route prediction request was received from the guidance route determination unit 223 as an additional key. The travel record learning unit 225 outputs the guidance route obtained by the retrieval to the guidance route determination unit 223.

Subsequently, the guidance route determination unit 223 calculates the vehicle traffic condition index value for the setting route, the vehicle traffic condition index value for each candidate route obtained by the retrieval in step ST310, and the vehicle traffic condition index value for the predicted guidance route predicted in step ST318 (step ST319).

The guidance route determination unit 223 determines a route in which the degree of non-congestion based on the area traffic condition index value is higher than that of the setting route set presently among the candidate route and the predicted guidance route as the guidance route (step ST320).

More specifically, the guidance route determination unit 223 subtracts a vehicle travel distance corresponding to the setting route from the total travel time which is one of the area traffic condition index values before replacement and adds the vehicle travel distance corresponding to the candidate route or the predicted guidance route to calculate the total travel time which is one of the area traffic condition index values after replacement. Moreover, the guidance route determination unit 223 subtracts a vehicle congestion distance corresponding to the setting route from the total congestion distance which is one of the area traffic condition index values before replacement and adds the vehicle congestion distance corresponding to the candidate route or the predicted guidance route to calculate the total congestion distance which is one of the area traffic condition index values after replacement. The guidance route determination unit 223 determines a candidate route or a predicted guidance route in which the degree of non-congestion based on the area traffic condition index value after replacement is higher than the degree of non-congestion based on the area traffic condition index value before replacement as the guidance route.

When the degree of non-congestion based on the area traffic condition index value after replacement of the vehicle traffic condition index value of the setting route with the vehicle traffic condition index value of the candidate route is higher than the degree of non-congestion based on the area traffic condition index value after replacement of the vehicle traffic condition index value of the setting route with the vehicle traffic condition index value of the predicted guidance route, the guidance route determination unit 223 determines the predicted guidance route as the guidance route if the difference in the degree of non-congestion based on both area traffic condition index values is within a predetermined range. On the other hand, the guidance route determination unit 223 determines the candidate route in which the degree of non-congestion based on the area traffic condition index value is the largest as the guidance route if the difference in the degree of non-congestion based on both area traffic condition index values is outside the predetermined range.

In step ST315, after retrieving the candidate route to the destination which avoids the bottleneck road segment, the guidance route determination unit 223 outputs the guidance route prediction request to the travel record learning unit 225.

The travel record learning unit 225 receives the prediction request and predicts the guidance route for the identification information correlated with the vehicle positional information read in step ST307 (step ST321). That is, the travel record learning unit 224 executes the prediction phase for the above-described guidance route. The travel record learning unit 225 outputs the guidance route obtained by retrieval to the guidance route determination unit 223.

Subsequently, the guidance route determination unit 223 calculates the vehicle traffic condition index value for each candidate route obtained by the retrieval in step ST315 and the vehicle traffic condition index value for the predicted guidance route in step ST321 (step ST322).

The guidance route determination unit 223 determines a route in which the degree of non-congestion based on the area traffic condition index value is the highest among the candidate route and the predicted guidance route as the guidance route (step ST323).

More specifically, the guidance route determination unit 223 adds the vehicle travel distance corresponding to the candidate route or the predicted guidance route to the total travel time which is one of the area traffic condition index values before addition to calculate the total travel time which is one of the area traffic condition index values after addition. Moreover, the guidance route determination unit 223 adds the vehicle congestion distance corresponding to the candidate route or the predicted guidance route to the total congestion distance which is one of the area traffic condition index values before addition to calculate the total congestion distance which is one of the area traffic condition index values after addition.

When the degree of non-congestion based on the area traffic condition index value after addition of the vehicle traffic condition index value of the candidate route is higher than the degree of non-congestion based on the area traffic condition index value after addition of the vehicle traffic condition index value of the predicted guidance route, the guidance route determination unit 223 determines the predicted guidance route as the guidance route if the difference between the degrees of non-congestion based on both area traffic condition index values is within a predetermined range. On the other hand, the guidance route determination unit 223 determines a candidate route in which the degree of non-congestion based on the area traffic condition index value is the largest as the guidance route if the difference between the degrees of non-congestion based on both area traffic condition index values is outside the predetermined range.

Third Embodiment

Figure 16:
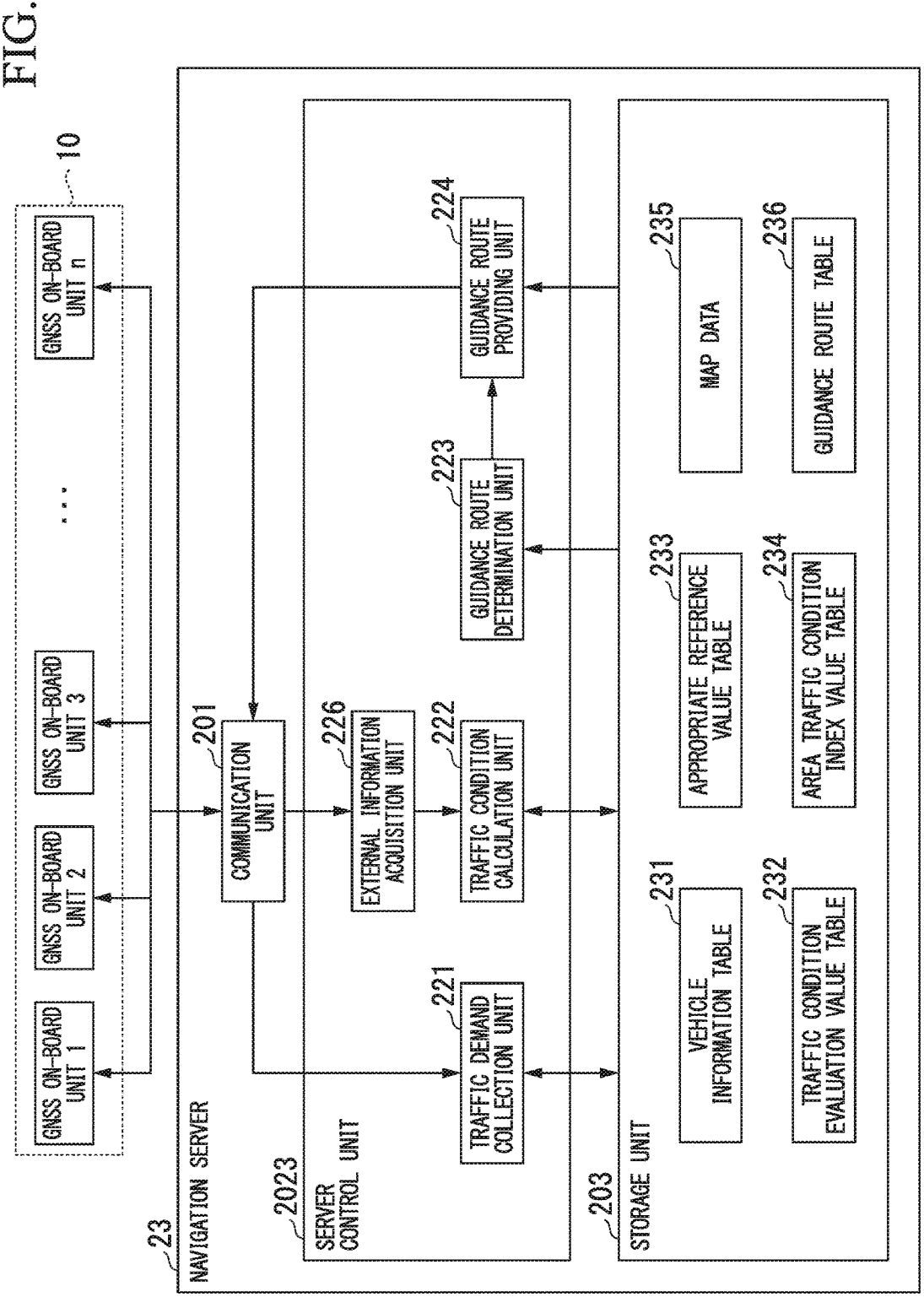
FIG. 16 is a schematic diagram illustrating an example of a navigation system according to a third embodiment of the present invention.

Next, an example of a navigation system 3 according to a third embodiment will be described. FIG. 16 is a schematic diagram illustrating an example of the navigation system 3 according to the third embodiment. The constituent elements similar to those included in the navigation system 1 according to the first embodiment will be denoted by the same reference numerals and the detailed description thereof will not be provided.

The navigation system 3 includes a plurality of GNSS on-board units 10 and a navigation server 23. The navigation server 23 includes a communication unit 201, a server control unit 2023, and a storage unit 203. The server control unit 2023 is a CPU, for example, and controls the navigation server 23 in an integrated manner. The navigation server 23 includes a traffic demand collection unit 221, a traffic condition calculation unit 222, a guidance route determination unit 223, a guidance route providing unit 224, and an external information acquisition unit 226 as functional units that function when the server control unit 2023 executes programs. Some or all of these functional units may be a hardware function unit such as an LSI or an ASIC.

The external information acquisition unit 226 acquires external information via the communication unit 201 and outputs the same to the traffic condition calculation unit 222. For example, the external information acquisition unit 226 communicates with a road-side sensor via the communication unit 201 and acquires the external information from an external server. The external information acquisition unit 226 may be connected to the external server via the Internet or the like.

The traffic condition calculation unit 222 sets a traffic condition evaluation value on the basis of the external information from the external information acquisition unit 226. In the embodiment, the traffic condition calculation unit 222 calculates the traffic condition evaluation value on the basis of the traffic condition evaluation value attribute information set by the external information acquisition unit 226 according to the external information. Without being limited thereto, the traffic condition calculation unit 222 may use the external information as the traffic condition evaluation value as it is and may calculate the traffic condition evaluation value according to the external information.

The external information includes traffic information, weather information, trouble information, event information, and the like, for example.

The traffic information is information indicating a traffic condition on each road segment. The traffic information includes information indicating a traffic density and information indicating a spatial average speed, for example. The external information acquisition unit 226 sets traffic condition evaluation value attribute information for using the traffic information as the traffic condition evaluation value P2 for the traffic density or the traffic condition evaluation value P3 for the spatial average speed as it is. Moreover, the external information acquisition unit 226 may calculate the traffic condition evaluation value corresponding to the road segment on the basis of the traffic information.

The weather information is information indicating a weather condition of a region included in each road segment. When the weather information indicates a predetermined weather condition, the external information acquisition unit 226 sets traffic condition evaluation value attribute information for determining that the corresponding road segment is a bottleneck road segment. For example, when the weather information indicates a weather condition indicating that a corresponding road is highly likely to be blocked due to heavy rain or the like, the external information acquisition unit 226 sets traffic condition evaluation value attribute information for determining that the corresponding road segment is a bottleneck road segment on the basis of an appropriate value corresponding to the road segment.

The trouble information includes information indicating a road segment under construction, information indicating a blocked road segment, or information indicating a road segment where an accident occurs. The external information acquisition unit 226 sets traffic condition evaluation value attribute information for determining that a road segment under construction or the like is a bottleneck road segment on the basis of the trouble information to the corresponding road segment.

The event information is information indicating the influence of an event on a traffic jam. When an event such as a firework display or a festival is held, it is predicted that the surrounding roads are congested. The event information is information indicating a predicted degree of congestion depending on the scale of the event and the time period in which it is held. The external information acquisition unit 226 sets traffic condition evaluation value attribute information for adding an increase in a traffic load to the traffic condition evaluation value calculated according to the road segment on the basis of the event information.

Figure 17:
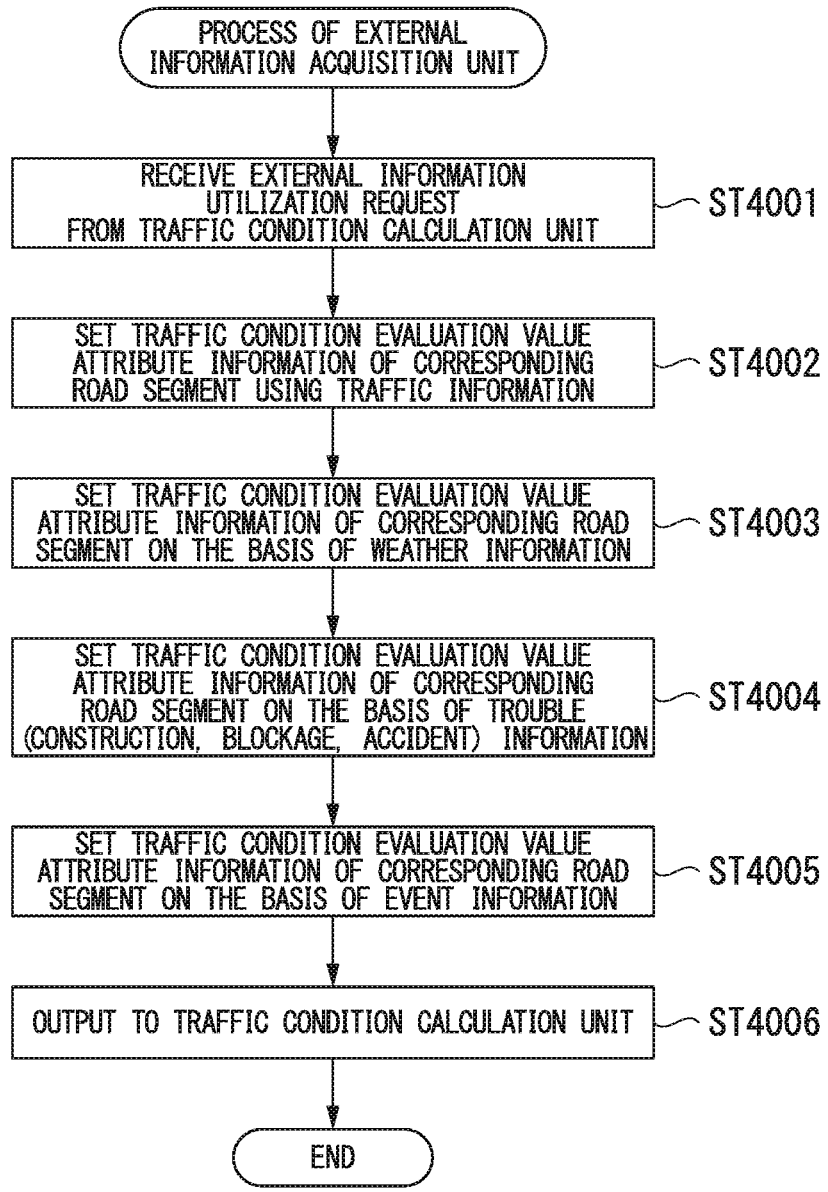
FIG. 17 is a flowchart for describing an example of a process flow of an external information acquisition unit according to the third embodiment of the present invention.

Next, the process flow of the external information acquisition unit 226 will be described with reference to FIG. 17. FIG. 17 is a flowchart for describing an example of the process flow of the external information acquisition unit 226.

The external information acquisition unit 226 receives an external information utilization request from the traffic condition calculation unit 222 (step ST4001).

The external information acquisition unit 226 sets the traffic condition evaluation value attribute information of each road segment on the basis of the traffic information received via the communication unit 201 (step ST4002).

Moreover, the external information acquisition unit 226 determines whether the weather information received via the communication unit 201 indicates a predetermined weather condition. When the weather information indicates the predetermined weather condition, the external information acquisition unit 226 sets traffic condition evaluation value attribute information indicating that the corresponding road segment is a bottleneck road segment (step ST4003).

The external information acquisition unit 226 sets traffic condition evaluation value attribute information indicating that a road segment under construction or the like is determined to be a bottleneck road segment for the corresponding road segment on the basis of the trouble information received via the communication unit 201 (step ST4004).

The external information acquisition unit 226 sets traffic condition evaluation value attribute information for adding an increase in a traffic load to the traffic condition evaluation value calculated according to the road segment on the basis of the event information received via the communication unit 201 (step ST4005).

The external information acquisition unit 226 outputs the set traffic condition evaluation value attribute information to the traffic condition calculation unit 222 (step ST4006).

(Process Flow of Traffic Condition Calculation Unit 222)

Figure 18:
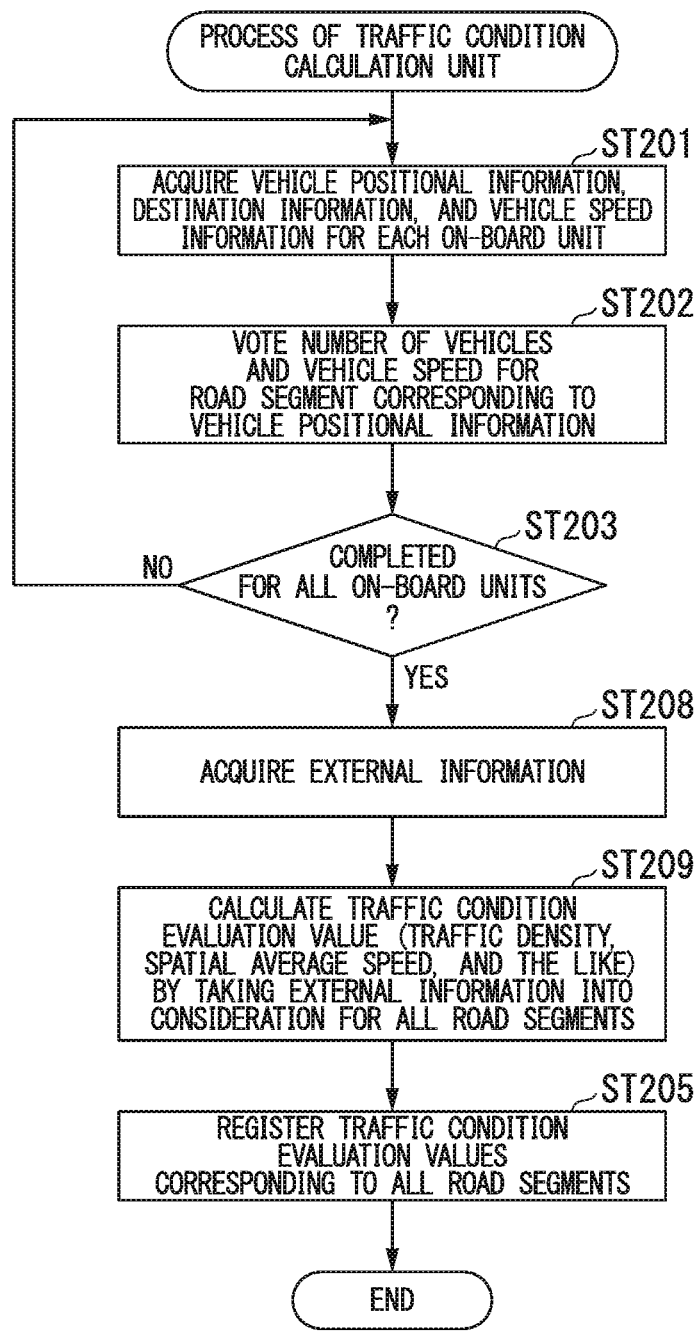
FIG. 18 is a flowchart for describing an example of a process flow of a traffic condition calculation unit according to the third embodiment of the present invention.

Next, the process flow of the traffic condition calculation unit 222 will be described with reference to FIG. 18. FIG. 18 is a flowchart for describing an example of the process flow of the traffic condition calculation unit 222.

Since steps ST201 to ST203 and ST205 are the same as the above-described processes, the detailed description thereof will not be provided. Moreover, in the present embodiment, the traffic condition calculation unit 222 executes step ST209 instead of step ST204.

When it is determined in step ST203 that the processes of steps ST201 to ST202 have been executed for all target GNSS on-board units 10, the traffic condition calculation unit 222 outputs an external information utilization request to the external information acquisition unit 226. The external information acquisition unit 226 receives the utilization request and acquires the external information for the road segment corresponding to one item of vehicle positional information read in step ST201 (step ST208). The external information acquisition unit 226 sets the traffic condition evaluation value attribute information on the basis of the acquired external information.

The traffic condition calculation unit 222 calculates the traffic condition evaluation value of each road segment by taking the external information into consideration on the basis of the traffic condition evaluation value attribute information set by the external information acquisition unit 226 (step ST209).

(Operations and Advantages)

As described above, the navigation systems 1 to 3 according to the present embodiment include: the guidance route determination unit 223 that calculates the area traffic condition index value indicating the vehicle traffic conditions of a group of vehicles in the navigation target area on the basis of the traffic condition evaluation value of each road segment for a plurality of routes to the same destination of each vehicle and determines a route in which the degree of non-congestion based on the area traffic condition index value is the highest among the plurality of routes to the same destination for one vehicle as the guidance route; and the guidance route providing unit 224 that provides the guidance route to the driver of each vehicle.

With this configuration, it is possible to determine a guidance route which improves the traffic condition of an entire navigation target area and to provide the same to the driver of each vehicle. Therefore, when the guidance route is set as the navigation route of each vehicle, each vehicle can be guided to the guidance route. In this way, it is possible to improve the traffic condition of the entire navigation target area.

In the navigation systems 1 to 3 according to the present embodiment, the guidance route determination unit 223 prepares routes that do not include the bottleneck road segment in which the value based on the traffic condition evaluation value is lower than the reference value as the plurality of routes to the same destination.

With this configuration, it is possible to determine a route that does not include the bottleneck road segment as the guidance route. Therefore, it is possible to remove a road segment in which congestion is highly likely to occur from the guidance route and to further improve the traffic condition of the entire navigation target area.

In the navigation systems 1 to 3 according to the present embodiment, when the setting route is set, a candidate route in which the degree of non-congestion based on the area traffic condition index value is higher than that of the setting route is provided to the driver of the corresponding vehicle.

With this configuration, when the traffic condition changes after the setting route has been set and the other route provides a better traffic condition than the setting route set in advance, it is possible to provide a route that provides a better traffic condition to the driver of each vehicle. Therefore, it is possible to improve the traffic condition of the entire navigation target area according to a change in the traffic condition.

The navigation system 2 according to the present embodiment further includes the travel record learning unit 225 that predicts a predicted guidance route which is highly likely to be set for the vehicle on the basis of a record value set as a route for navigating the vehicle among the guidance routes. The guidance route determination unit 223 calculates the area traffic condition index value for the guidance route predicted by the travel record learning unit 225 and the area traffic condition index value for the candidate route. The guidance route providing unit 224 provides a predicted guidance route in which the degree of non-congestion based on the area traffic condition index value is higher than that of the candidate route to the driver of the corresponding vehicle.

With this configuration, a guidance route which is highly likely to be set for each vehicle can be provided to the driver of the corresponding vehicle.

In the navigation system 2 according to the present embodiment, when there is a route in which the degree of non-congestion based on the area traffic condition index value is higher than that of the predicted guidance route predicted by the travel record learning unit 225, the predicted guidance route predicted by the travel record learning unit 225 is provided to the driver of the corresponding vehicle if the difference between the highest value of the degree of non-congestion and the degree of non-congestion of the predicted guidance route is within a predetermined range.

With this configuration, a predicted guidance route predicted by the travel record learning unit 225 can be provided to the driver of the corresponding vehicle more preferentially than a candidate route that provides a relatively good area traffic condition index value. In this way, when there is no great difference in the area traffic condition index value, it is possible to provide a guidance route corresponding to the past preference of the driver.

The navigation system 2 according to the present embodiment further includes the travel record learning unit 225 that predicts a traffic condition which is highly likely to occur in a road segment on the basis of a record value of the traffic condition evaluation value calculated by the guidance route determination unit 223. The traffic condition calculation unit 222 calculates the traffic condition evaluation value corresponding to each road segment on the basis of the traffic condition predicted by the travel record learning unit 225.

With this configuration, a traffic condition which is highly likely to occur in a road segment can be reflected in the traffic condition evaluation value.

The navigation system 2 according to the present embodiment further includes the travel record learning unit 225 that predicts a predicted destination which is highly likely to be set for the vehicle on the basis of a record value set as the destination of each vehicle. The guidance route determination unit 223 prepares a plurality of routes to the predicted destination on the basis of the predicted destination predicted by the travel record learning unit 225.

With this configuration, a predicted destination which is highly likely to be set for the vehicle can be set as the destination of navigation. Therefore, it is possible to alleviate the time and effort of inputting a destination or the like for the driver.

The navigation system 3 according to the present embodiment further includes the external information acquisition unit 226 that acquires external information via the communication unit. The traffic condition calculation unit 222 calculates the traffic condition evaluation value on the basis of the external information acquired by the external information acquisition unit 226.

With this configuration, it is possible to calculate the traffic condition evaluation value by taking the external information into consideration. Therefore, it is possible to ascertain the traffic condition which cannot be ascertained from the movement of vehicles only.

(Addition, Replacement, or Modification of Elements)

In addition, the constituent elements of the above-described embodiments can be substituted with known constituent elements without departing from the gist of the present invention. Moreover, the technical scope of the present invention is not limited to the above-described embodiments, and the embodiments can be modified in various forms without departing from the gist of the present invention.

For example, although an example in which the navigation server 23 according to the third embodiment includes the travel record learning unit 225 in addition to the navigation server 20 according to the first embodiment has been described, the present invention is not limited thereto. The navigation server 23 according to the third embodiment may include the travel record learning unit 225 in addition to the navigation server 22 according to the second embodiment.

REFERENCE SIGNS LIST

1 Navigation system
10 GNSS on-board unit
20 Navigation server
101 Communication unit
102 Sensor
103 GNSS receiver
104 Clock
105 Storage unit
106 On-board unit controller
107 Operating unit
108 Output unit
161 Positional information generation unit
162 Navigation control unit
201 Communication unit
202 Server control unit
203 Storage unit
221 Traffic demand collection unit
222 Traffic condition calculation unit
223 Guidance route determination unit
224 Guidance route providing unit
225 Travel record learning unit
226 External information acquisition unit
231 Vehicle information table
232 Traffic condition evaluation value table
233 Appropriate reference value table
234 Area traffic condition index value table
235 Map data
236 Guidance route table
237 Predicted destination learning table
238 Destination statistics frequency distribution
239 Predicted evaluation value learning table
240 Evaluation value statistics frequency distribution
241 Predicted guidance route learning table
242 Guidance route statistics frequency distribution

The invention claimed is:

1. A navigation system comprising:
a traffic condition calculation unit that calculates a traffic condition evaluation value indicating a traffic condition of each road segment included in a target area;
a guidance route determination unit that prepares a plurality of routes to a same destination for each vehicle in the target area, calculates an area traffic condition index value indicating a traffic condition of a group of vehicles in the target area and obtained by integrating index values indicating the traffic condition of the plurality of routes prepared for each vehicle for all vehicles in the target area on a basis of the traffic condition evaluation value calculated by the traffic condition calculation unit according to the plurality of routes to the same destination of each vehicle, and determines a route in which a degree of non-congestion based on the area traffic condition index value is highest among the plurality of routes to the same destination for one vehicle as a guidance route; and
a guidance route providing unit that provides the guidance route determined by the guidance route determination unit to a driver of a corresponding vehicle.

2. The navigation system according to claim 1, wherein the guidance route determination unit prepares routes that do not include a bottleneck road segment in which a value based on the traffic condition evaluation value is lower than a reference value as the plurality of routes to the same destination.

3. The navigation system according to claim 1, wherein when a setting route to the destination is set for the vehicle, the guidance route determination unit prepares at least one candidate route of which the destination is the same as the setting route and in which the route to the destination is different from the setting route and calculates the area traffic condition index value for the setting route and the area traffic condition index value for the candidate route, and
the guidance route providing unit provides the candidate route in which the degree of non-congestion based on the area traffic condition index value is higher than that of the setting route to the driver of the corresponding vehicle.

4. The navigation system according to claim 1, further comprising:
a first travel record learning unit that predicts a predicted guidance route which is set for the vehicle on a basis of a record value set as a route for navigating the vehicle among the guidance routes provided by the guidance route providing unit, wherein
the guidance route determination unit calculates the area traffic condition index value for the predicted guidance route predicted by the first travel record learning unit and the area traffic condition index value for the plurality of routes to the same destination, and
the guidance route providing unit provides the predicted guidance route in which the degree of non-congestion based on the area traffic condition index value is higher than that of the plurality of routes to the same destination to the driver of the corresponding vehicle.

5. The navigation system according to claim 4, wherein, when a route in which the degree of non-congestion based on the area traffic condition index value is higher than that of the predicted guidance route exists among the plurality of routes to the same destination, the guidance route providing unit provides the predicted guidance route to the driver of the corresponding vehicle if a difference between a highest value of the degree of non-congestion and the degree of non-congestion of the predicted guidance route is within a predetermined range.

6. The navigation system according to claim 1, further comprising:
a second travel record learning unit that predicts a traffic condition which occurs in the road segment on a basis of a record value of the traffic condition evaluation value calculated by the guidance route determination unit, wherein
the traffic condition calculation unit calculates the traffic condition evaluation value corresponding to each road segment on a basis of the traffic condition predicted by the second travel record learning unit.

7. The navigation system according to claim 1, further comprising:
a third travel record learning unit that predicts a predicted destination which is set for the vehicle on a basis of a record value set as the destination of each vehicle, wherein
the guidance route determination unit prepares a plurality of routes to the predicted destination as the plurality of routes to the same destination on a basis of the predicted destination predicted by the third travel record learning unit.

8. The navigation system according to claim 1, further comprising:
an external information acquisition unit that acquires external information via a communication unit, wherein
the traffic condition calculation unit calculates the traffic condition evaluation value on a basis of the external information acquired by the external information acquisition unit.

9. An on-board unit comprising:
a positional information generation unit that acquires vehicle positional information indicating a position of a vehicle;
a communication unit that transmits the vehicle positional information acquired by the positional information generation unit and route information indicating a setting route to a destination set for the vehicle to a navigation server; and
a navigation control unit that receives at least one candidate route of which the destination is the same as the setting route and in which the route to the destination is different from the setting route, from the navigation server via the communication unit and outputs information for navigating the vehicle according to the candidate route from an output unit, the candidate route being a route in which a degree of non-congestion based on an area traffic condition index value is higher than a degree of non-congestion based on the area traffic condition index value of the setting route, the area traffic condition index value being obtained by integrating index values indicating a traffic condition of the setting route or the candidate route for each vehicle for all vehicles in a target area on a basis of an evaluation value indicating the traffic condition of each road segment included in the target area.

* * * * *